United States Patent [19]
Yokota et al.

[11] Patent Number: 5,673,152
[45] Date of Patent: Sep. 30, 1997

[54] OPTICAL PICKUP COMPRISING A HEAT-INSULATING MATERIAL

[75] Inventors: Yasuo Yokota, Hirakata; Yukihiro Iwata, Takatsuki; Hirotsugu Fusayasu, Katano; Hiroto Inoue, Hirakata; Atsufumi Ishizuka, Yokohama; Yukihiro Okada, Katano, all of Japan

[73] Assignee: Matsushita Electric Industrial Co., Ltd., Japan

[21] Appl. No.: 714,568

[22] Filed: Sep. 16, 1996

[30] Foreign Application Priority Data

Sep. 20, 1995 [JP] Japan .................. 7-241071

[51] Int. Cl.⁶ .................................. G02B 7/02
[52] U.S. Cl. .................. 359/813; 359/814; 359/823; 359/824
[58] Field of Search ................. 359/813, 814, 359/820, 823, 824; 369/44.14, 44.15, 44.16

[56] References Cited

U.S. PATENT DOCUMENTS

| | | | |
|---|---|---|---|
| 4,646,283 | 2/1987 | Ito et al. | 369/256 |
| 4,796,121 | 1/1989 | Adamek et al. | 360/78.13 |
| 5,018,836 | 5/1991 | Noda et al. | 359/814 |
| 5,264,968 | 11/1993 | Masunaga | 359/824 |
| 5,299,183 | 3/1994 | Yamaguchi | 369/44.14 |
| 5,313,332 | 5/1994 | Schell et al. | 359/813 |
| 5,555,228 | 9/1996 | Izuka | 369/44.15 |
| 5,600,619 | 2/1997 | Takekoshi et al. | 359/112 |

FOREIGN PATENT DOCUMENTS

| | | |
|---|---|---|
| 0 053 476 | 6/1982 | European Pat. Off. . |
| 0 137 283 | 4/1985 | European Pat. Off. . |
| 0 419 097 | 3/1991 | European Pat. Off. . |
| 0 510 652 | 10/1992 | European Pat. Off. . |
| 0 561 420 | 8/1993 | European Pat. Off. . |
| 59-071137 | 4/1984 | Japan . |
| 60-076040 | 4/1985 | Japan . |
| 60-117425 | 6/1985 | Japan . |
| 61-233438 | 3/1987 | Japan . |
| 62-089244 | 4/1987 | Japan . |
| 63-268138 | 11/1988 | Japan . |
| 63-213132 | 1/1989 | Japan . |
| 1-185845 | 10/1989 | Japan . |
| 6-111357 | 4/1994 | Japan . |
| 7-235093 | 9/1995 | Japan . |

*Primary Examiner*—Georgia Y. Epps
*Assistant Examiner*—Ricky Mack
*Attorney, Agent, or Firm*—Snell & Wilmer; Michael K. Kelly

[57] ABSTRACT

An optical pickup includes an object lens; a lens holder for holding the object lens; a visco-elastic suspender for suspending the lens holder so as to be movable in a focusing direction and a tracking direction; a driving section for driving the lens holder in the focusing direction and the tracking direction, the driving section including a magnet, a yoke and a driving coil provided on the lens holder. The magnet and the yoke form a magnetic circuit. A heat-insulating area is located between the object lens and the driving coil, and the heat-insulating area includes a heat-insulating material which has a thermal conductivity lower than that of the lens holder.

19 Claims, 16 Drawing Sheets

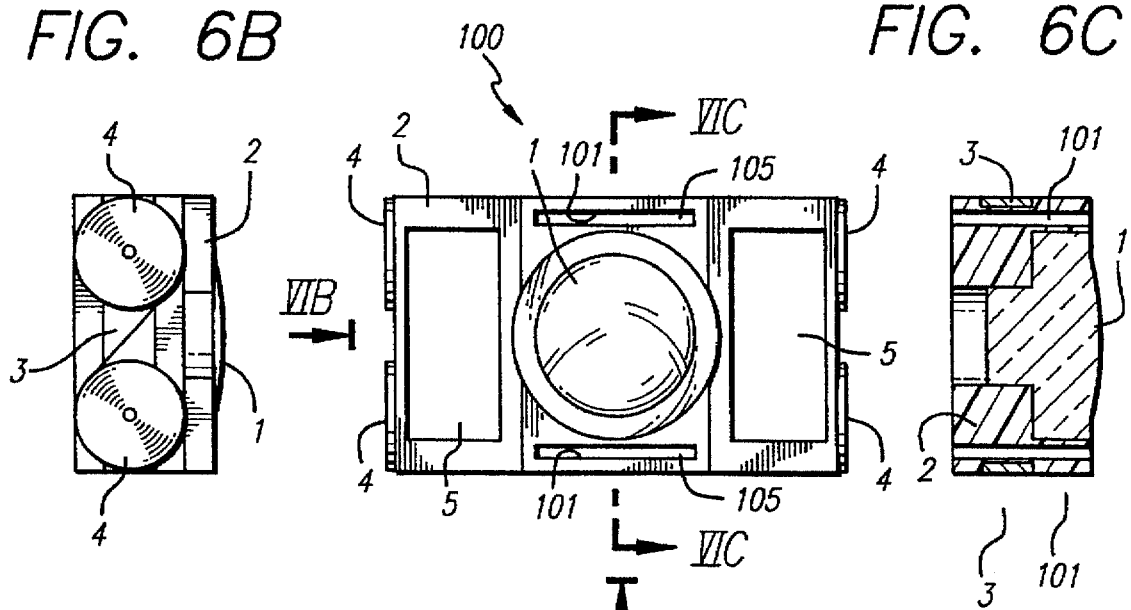
FIG. 6A
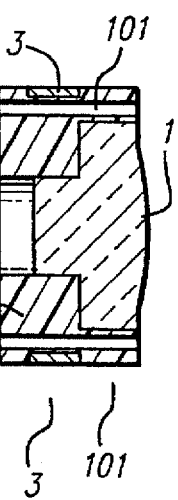
FIG. 6B
FIG. 6C
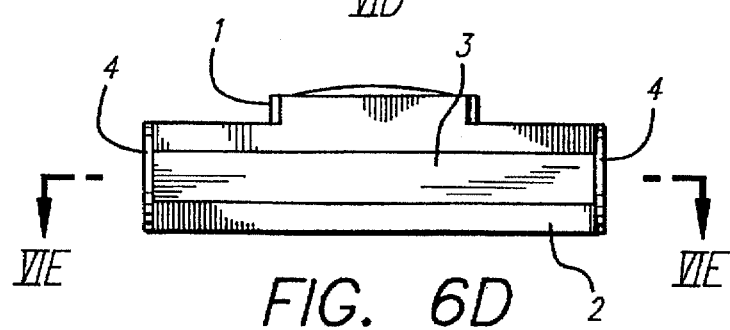
FIG. 6D
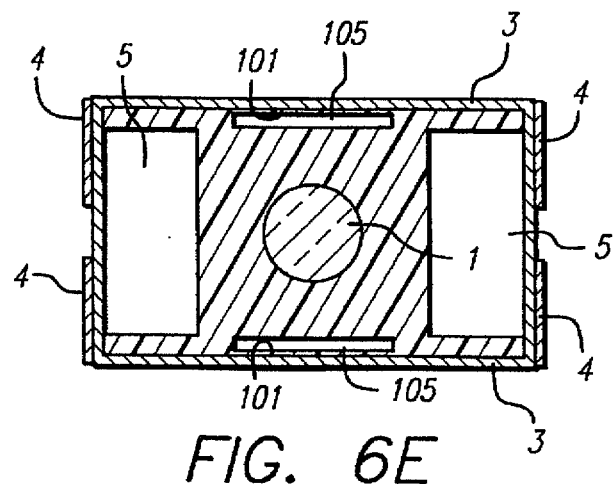
FIG. 6E

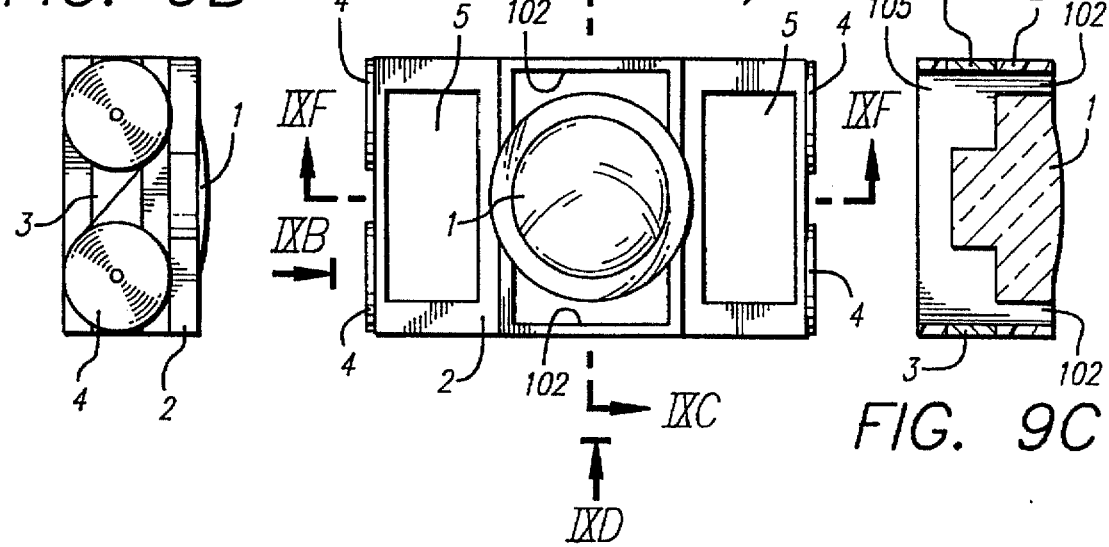
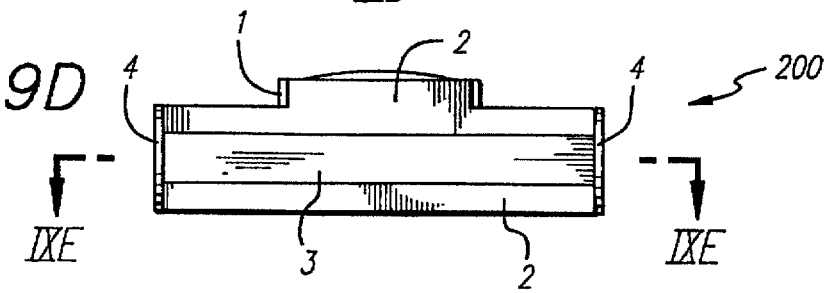
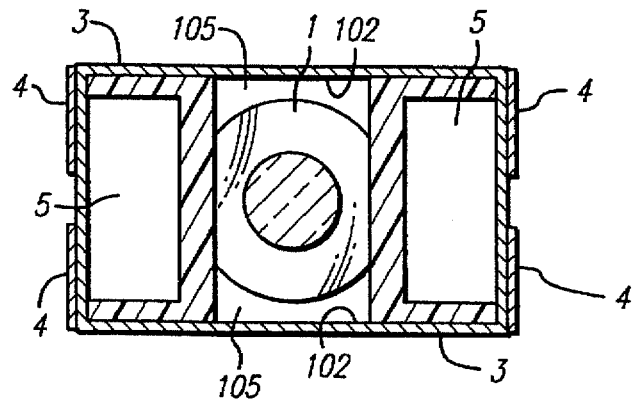
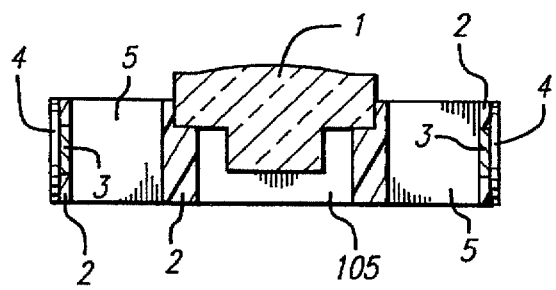

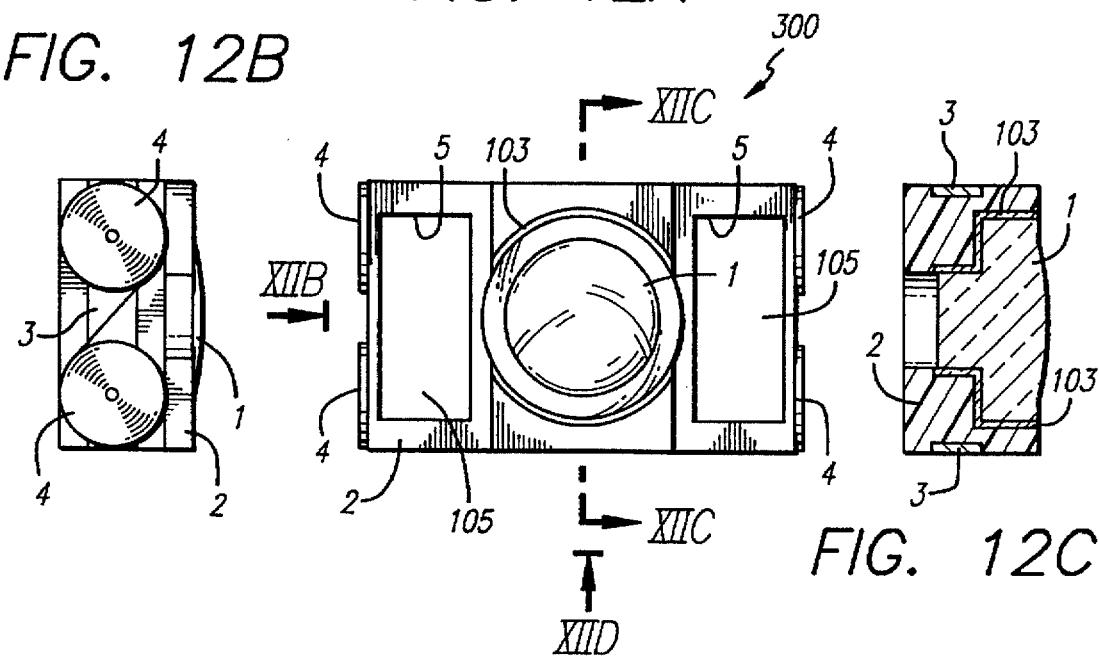
FIG. 12A
FIG. 12B
FIG. 12C
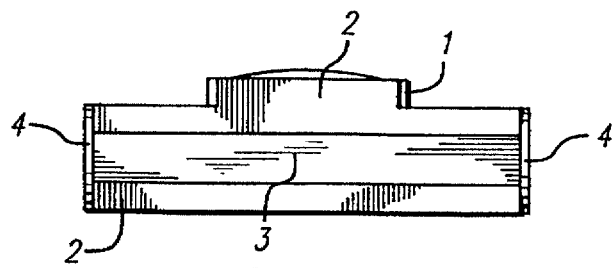
FIG. 12D
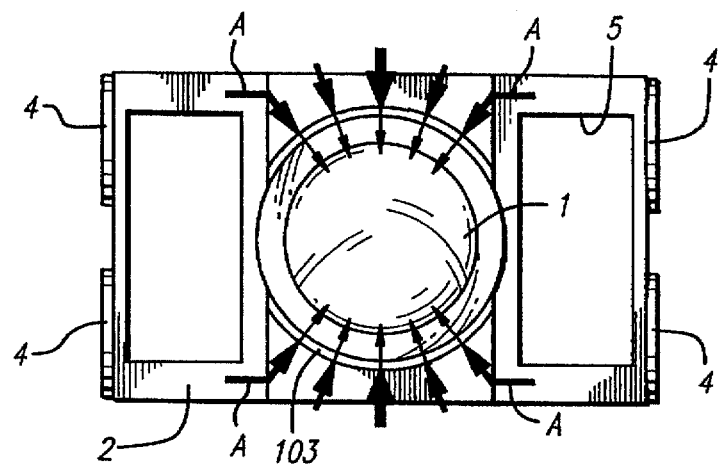
FIG. 13

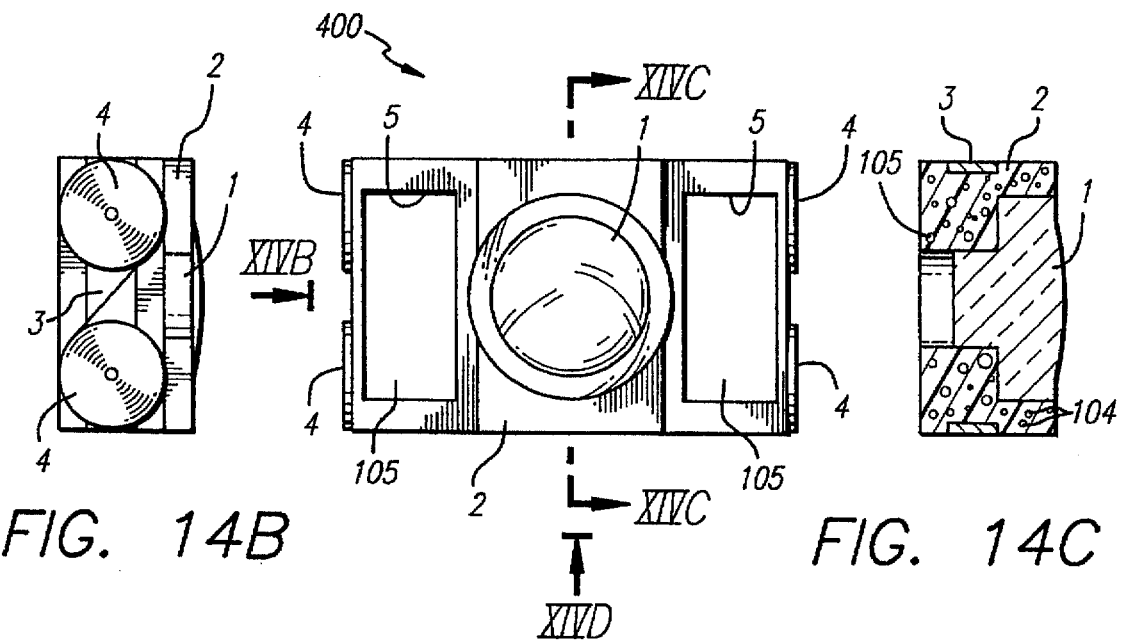
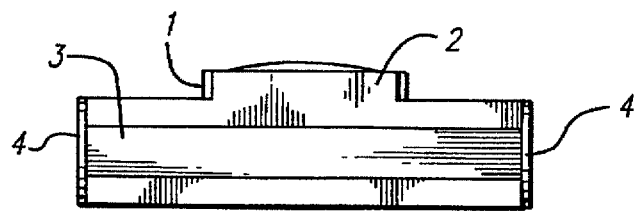
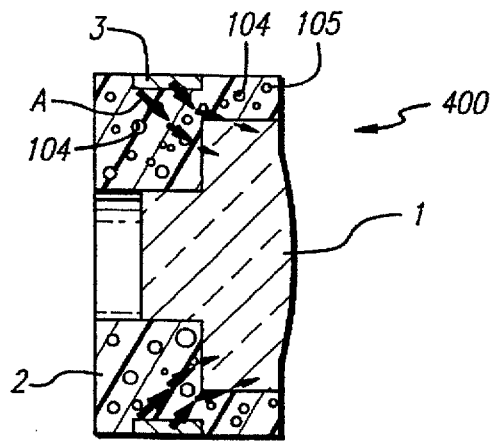

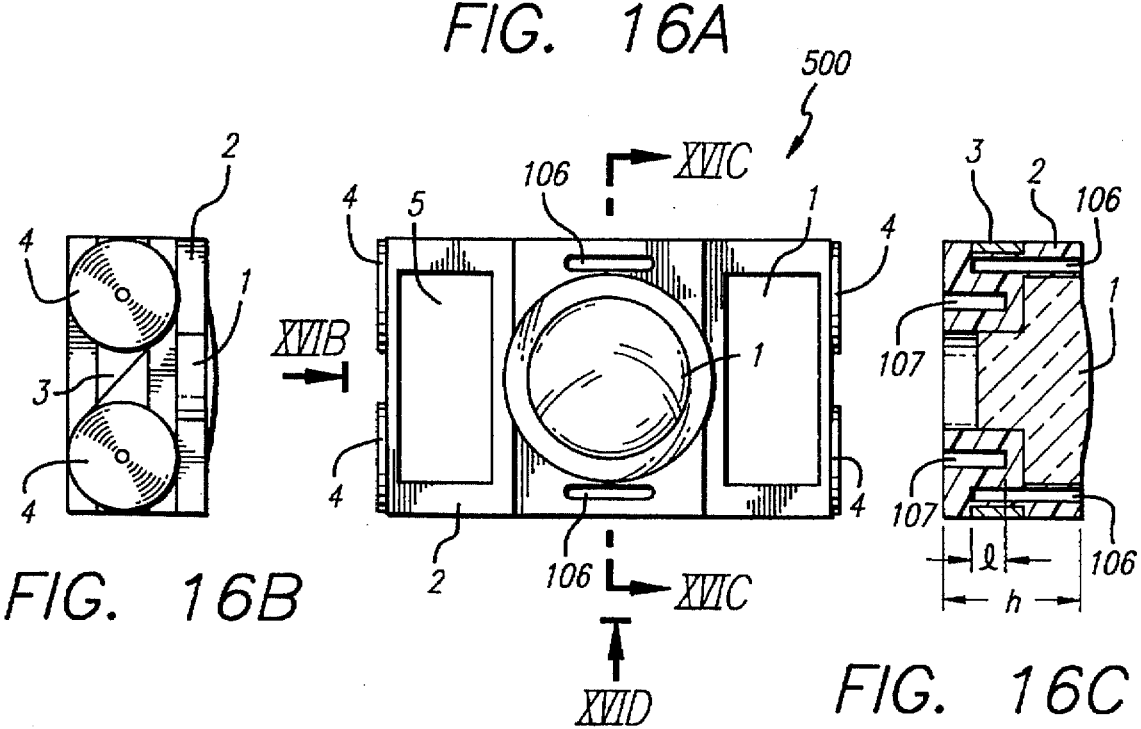
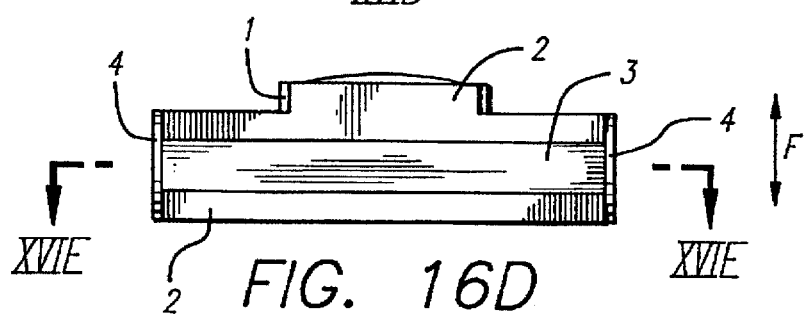
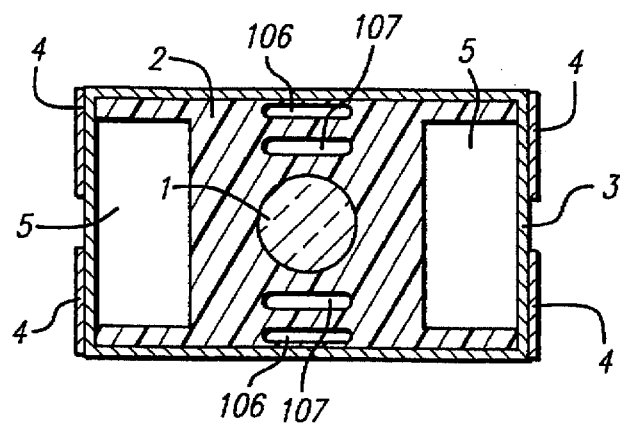
FIG. 16A
FIG. 16B
FIG. 16C
FIG. 16D
FIG. 16E

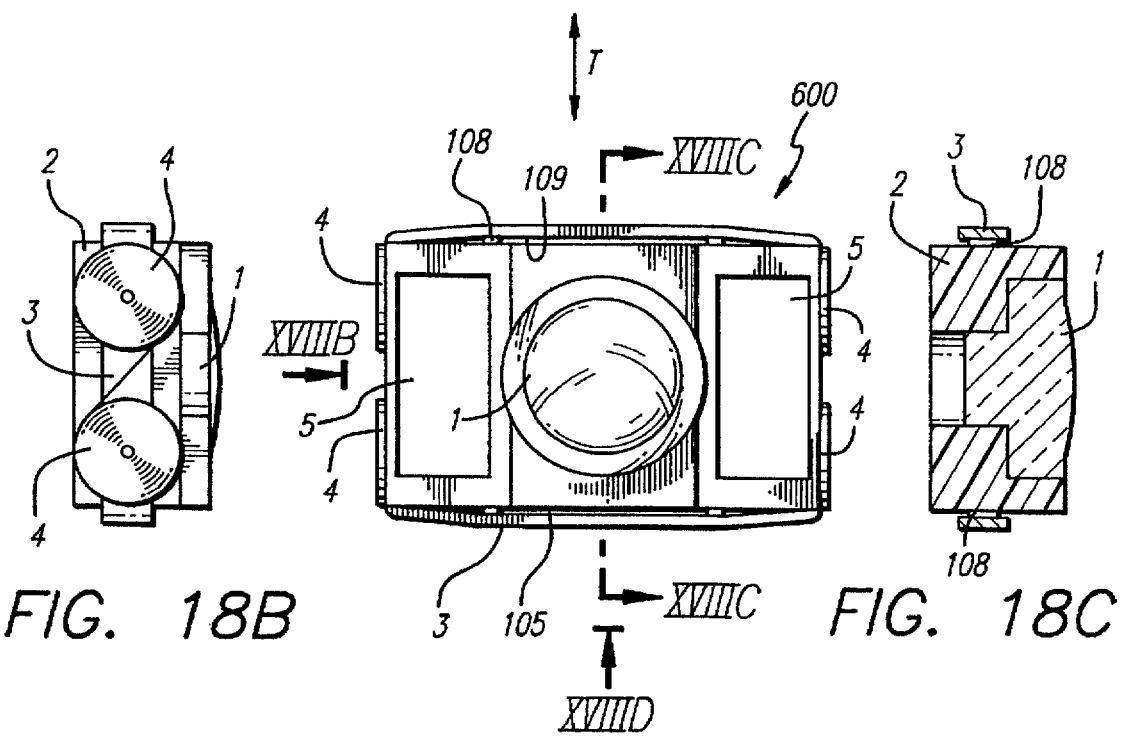
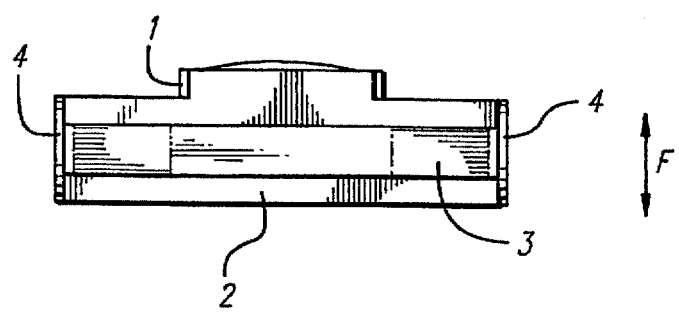
FIG. 18A
FIG. 18B
FIG. 18C
FIG. 18D

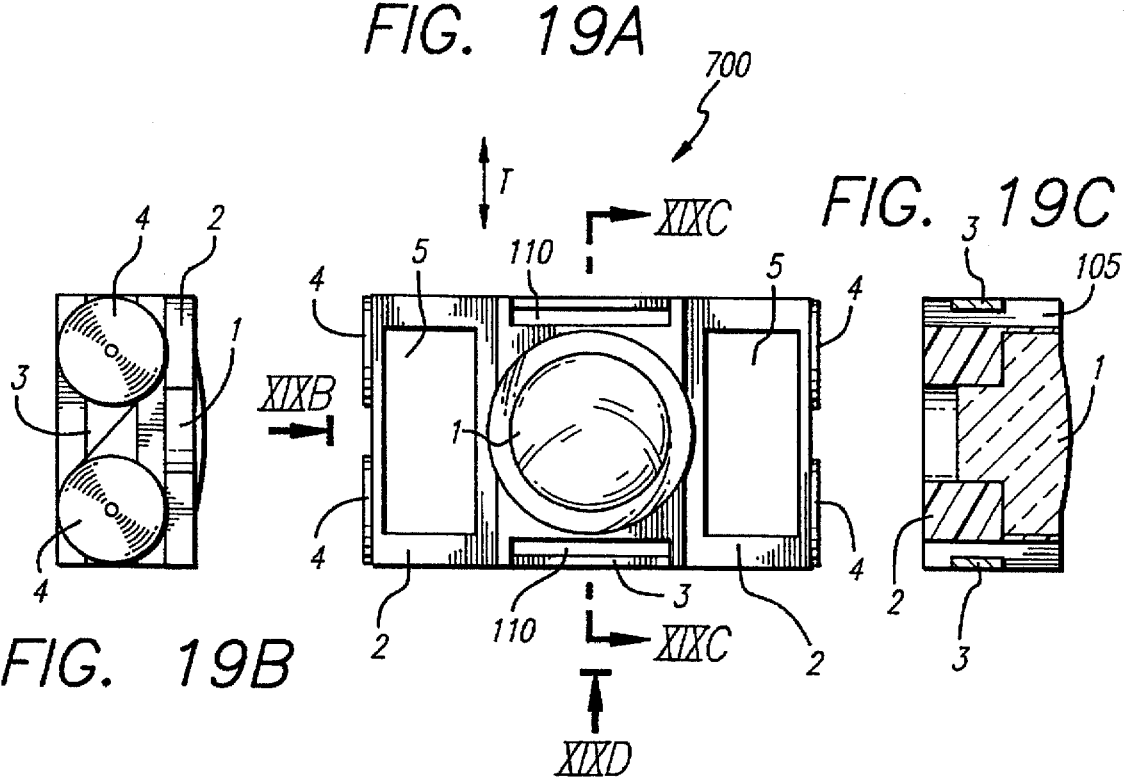
FIG. 19A
FIG. 19C
FIG. 19B
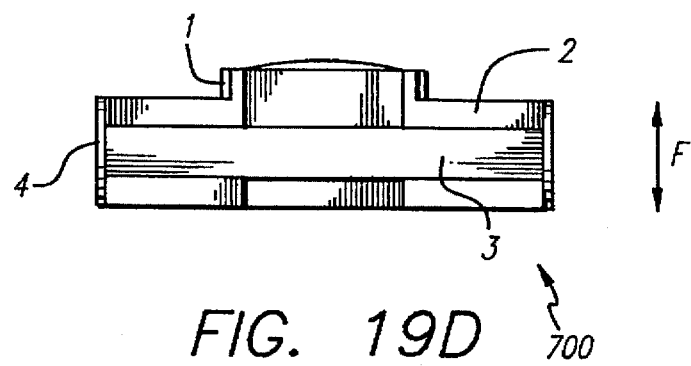
FIG. 19D

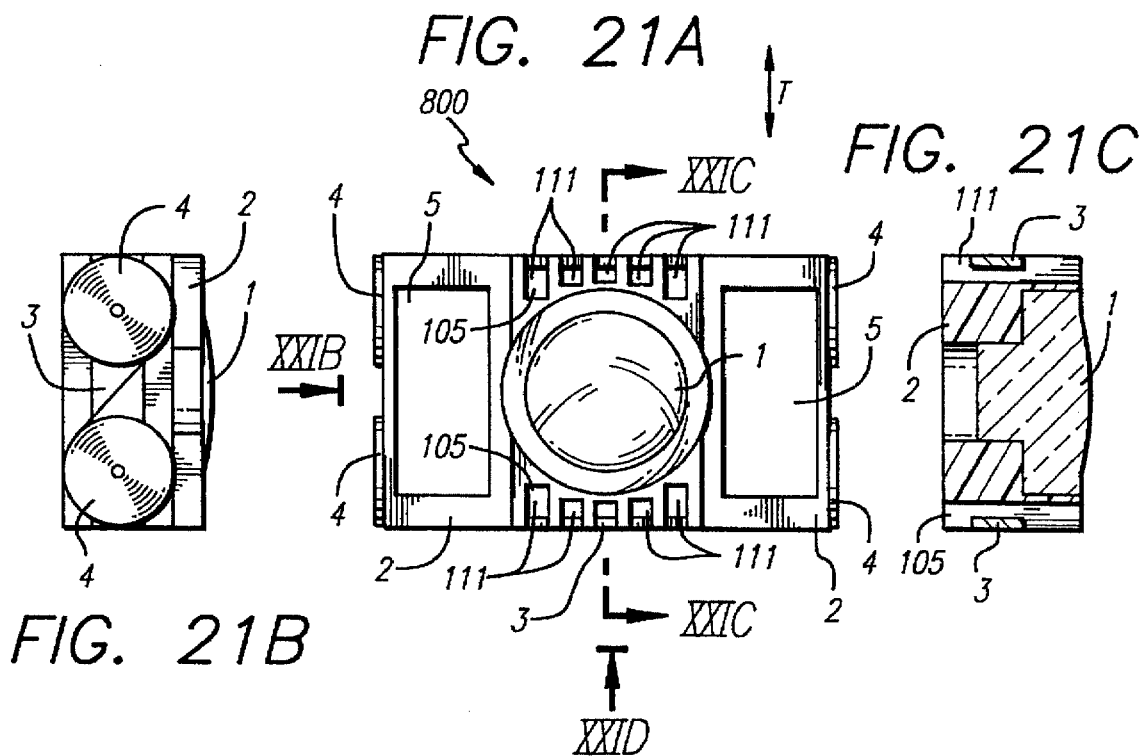
FIG. 21A
FIG. 21B
FIG. 21C
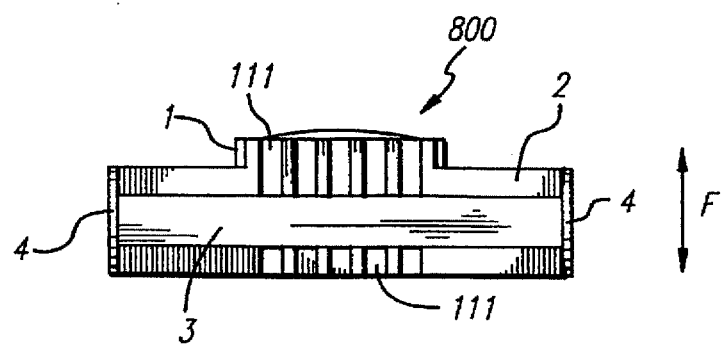
FIG. 21D

OPTICAL PICKUP COMPRISING A HEAT-INSULATING MATERIAL

BACKGROUND OF THE INVENTION

1. Field of the Invention

The present invention relates to an optical pickup used in an optical information recording and reproduction apparatus for recording information to and reproducing information from a disk-shaped recording medium such as a CD-ROM, a PD (optical disk developed by Matsushita Electric Industrial, Co., Ltd.), an MD (mini disk), or a DVD (digital video disk).

2. Description of the Related Art

An optical information recording and reproduction apparatus records information by, for example, forming pits or changing a magnetic field in a rotating disk-shaped recording medium such as a compact disk using laser light transmitted through an optical pickup. The optical information recording and reproduction apparatus reproduces information by reading light reflected by the recording medium. Due to the recent increase in the capacity of computer software, optical information recording and reproduction apparatuses have been used more and more widely for installing software, in an external memory, and the like. Faster reading of a larger quantity of information is now demanded.

In such an optical information recording and reproduction apparatus, focus control and tracking control are important. If the disk-shaped recording medium is warped, the distance between the surface of the recording medium and the object lens of the optical pickup varies as the recording medium rotates, resulting in a focusing error. If the rotation of the recording medium is off-center, a tracking error occurs. In order to prevent a focusing or a tracking error, the object lens of the optical pickup is driven in two directions, namely, along the optical axis of the object lens which is vertical to the surface of the recording medium (focusing direction) and along the direction parallel to the surface of the recording medium (tracking direction).

With reference to FIGS. 1 through 4, a conventional optical pickup of an optical recording and reproduction will be described.

FIG. 1 is a partially exploded isometric view of a conventional optical pickup 1000, FIG. 2 is an isometric view of the optical pickup 1000, FIG. 3 is a plan view of the optical pickup 1000, and FIG. 4 is a cross-sectional view of the optical pickup 1000 along chain line IV—IV in FIG. 3.

As shown in FIG. 1, the conventional optical pickup 1000 includes an object lens 1 and a lens holder 2 for holding the object lens 1 in a substantially central area of a top surface thereof. The lens holder 2 can be formed of a resin and is connected to a suspension holder 10 via four metal wires 7a, 7b, 7c and 7d (7d is not shown) and also the wire attachments 14a, 14b, 14c and 14d (14d is not shown). The metal wires 7a through 7d are parallel to one another. The wire attachments 14a and 14b are located at the corresponding positions on two side surfaces of the lens holder 2 which extend in a direction perpendicular to a tracking direction T. The wire attachments 14c and 14d are located below the wire attachments 14a and 14b respectively. The wire attachments 14a through 14d are respectively connected to the metal wires 7a, 7b, 7c and 7d, which are fixed to the suspension holder 10. The metal wires 7c and 7d are fixed at positions directly below the metal wires 7a and 7b in a plane parallel to a focusing direction F. The suspension holder 10 accommodates a visco-elastic element for restricting the resonance of the metal wires 7a, 7b, 7c and 7d, and thus suspends the lens holder 2 so as to be movable in the tracking direction T and in the focusing direction F. An optical base 12 is L-shaped as shown in FIG. 2. The suspension holder 10 is provided on the optical base 12, and the metal wires 7a through 7d are inserted through the optical base 12 and fixed to the optical base 12. A focusing coil 3 is provided around four side surfaces of the lens holder 2, and tracking coils 4 are provided on two side surfaces thereof which extend in the tracking direction T. The lens holder 2 has two through-holes 5 through which the inner yokes 6 are to be inserted. The through-holes 5 extend along the side surfaces on which the tracking coils 4 are provided.

A yoke 11 is mounted on the optical base 12. The yoke 11 has two inner yokes 6 and two outer yokes 9 projecting in the focusing direction F toward the object lens 1. Two magnets 8 are provided inside the two outer yokes 9 so as to be opposed to the inner yokes 6. The magnets 8 and the inner yokes 6 have an equal width in the tracking direction T. The magnets 8 and the yoke 11 form a magnetic circuit. The magnets 8, the outer yokes 9, and the inner yokes 6 form another magnetic circuit. The optical base 12 receives the lens holder 2 and suspension holder 10 by inserting the inner yokes 6 through two through-holes 5 (FIG. 2). In this state, the tracking coils 4 are located so as to be opposed to the magnets 8.

The optical base 12 further has a reflective mirror 13 (FIG. 4). A reflective surface 13a of the reflective mirror 13 is parallel to the tracking direction T so that light from a semiconductor laser (not shown) is reflected by the reflective surface 13a by 90 degrees and is incident on the object lens 1.

In the optical pickup 1000 having the above-described structure, the magnetic circuit formed by the magnets 8 and the yoke 11 and the focusing coil 3 located in a space inside the magnetic circuit form a converter having a driving force in the focusing direction F. By the converter, the lens holder 2 having the object lens 1 thereon is translated in the focusing direction F against an elastic force of the metal wires 7a through 7d in accordance with the amount of current flowing through the focusing coil 3.

Furthermore, the magnetic circuit formed by the magnets 8 and the yoke 11 and the tracking coil 4 located in a space inside the magnetic circuit form a converter having a driving force in the tracking direction T. By the converter, the lens holder 2 having the object lens 1 thereon is translated in the tracking direction T against the elastic force of the metal wires 7a through 7d in accordance with the amount of current flowing through the tracking coil 4.

The entirety of the optical pickup 1000 is driven in an access direction Ac (FIG. 3) by a motor (not shown).

SUMMARY OF THE INVENTION

An optical pickup according to the present invention includes an object lens; a lens holder for holding the object lens; a visco-elastic suspender for suspending the lens holder so as to be movable in a focusing direction and a tracking direction; a driving section for driving the lens holder in the focusing direction and the tracking direction, the driving section including a magnet, a yoke and a driving coil provided on the lens holder. The magnet and the yoke form a magnetic circuit. A heat-insulating area is located between the object lens and the driving coil, and the heat-insulating area includes a heat-insulating material which has a thermal conductivity lower than that of the lens holder.

In one embodiment of the invention, the object lens is located at a substantial center of a top surface of the lens holder. The driving coil includes a focusing coil and a tracking coil. The focusing coil is located around at least four side surfaces of the lens holder, and the tracking coil is located on two of the at least four side surfaces of the lens holder which extend parallel to the tracking direction.

In one embodiment of the invention, the heat-insulating area is included in the lens holder.

In one embodiment of the invention, the heat-insulating area is located between an outer circumferential surface of the object lens and the lens holder.

In one embodiment of the invention, the heat-insulating area is located between the driving coil and two of the at least four side surfaces of the lens holder.

In one embodiment of the invention, the heat-insulating material is air.

In one embodiment of the invention, the heat-insulating material is a solid having a thermal conductivity lower than that of the lens holder.

In one embodiment of the invention, the heat-insulating material is a sealed liquid having a thermal conductivity lower than that of the lens holder.

In one embodiment of the invention, the lens holder has at least one through-hole.

In one embodiment of the invention, a solid having a thermal conductivity lower than that of the lens holder is inserted into the through-hole.

In one embodiment of the invention, a sealed liquid having a thermal conductivity lower than that of the lens holder is inserted into the through-hole.

In one embodiment of the invention, the lens holder includes pores dispersed therein. The pores each include a heat-insulating material therein.

In one embodiment of the invention, the lens holder is formed of a porous material including air therein.

In one embodiment of the invention, the lens holder has a groove extending from a top surface of the lens holder and another groove extending from a bottom surface of the lens groove, and the heat-insulating material having a thermal conductivity lower than that of the lens holder is inserted into the grooves.

In one embodiment of the invention, the heat-insulating material is air.

In one embodiment of the invention, the lens holder is formed of a liquid crystal polymer.

In one embodiment of the invention, the object lens is formed of a resin.

In one embodiment of the invention, the optical pickup further includes a plurality of coil supporting elements between the driving coil and the lens holder.

In one embodiment of the invention, the lens holder has four side surfaces, two of the four side surfaces being closer to an outer peripheral surface of the object lens than the other two side surfaces. The driving coil is provided around the four side surfaces. The two side surfaces which are closer to the outer peripheral surface of the object lens each have at least one groove.

Thus, the invention described herein makes possible an advantage of providing an optical pickup used in an optical information recording and reproduction apparatus which can be driven at a higher speed for a longer period of time without degrading the performance of an object lens due to an excessive amount of heat.

This and other advantages of the present invention will become apparent to those skilled in the art upon reading and understanding the following detailed description with reference to the accompanying figures.

BRIEF DESCRIPTION OF THE DRAWINGS

FIG. 6A is a plan view of a movable section of an optical pickup in a first example according to the present invention;

FIG. 6B is a side view of the movable section shown in FIG. 6A as seen in the direction of arrow VIB in FIG. 6A;

FIG. 6C is a cross-sectional view of the movable section shown in FIG. 6A along chain line VIC—VIC in FIG. 6A;

FIG. 6D is a side view of the movable section shown in FIG. 6A as seen in the direction of arrow VID in FIG. 6A;

FIG. 6E is a cross-sectional view of the movable section shown in FIG. 6D along chain line VIE—VIE in FIG. 6D;

FIG. 9A is a plan view of a movable section of an optical pickup in a second example according to the present invention;

FIG. 9B is a side view of the movable section shown in FIG. 9A as seen in the direction of arrow IXB in FIG. 9A;

FIG. 9C is a cross-sectional view of the movable section shown in FIG. 9A along chain line IXC—IXC in FIG. 9A;

FIG. 9D is a side view of the movable section shown in FIG. 9A as seen in the direction of arrow IXD in FIG. 9A;

FIG. 9E is a cross-sectional view of the movable section shown in FIG. 9D along chain line IXE—IXE in FIG. 9D;

FIG. 9F is a cross-sectional view of the movable section shown in FIG. 9A along chain line IXF—IXF in FIG. 9A;

FIG. 12A is a plan view of a movable section of an optical pickup in a third example according to the present invention;

FIG. 12B is a side view of the movable section shown in FIG. 12A as seen in the direction of arrow XIIB in FIG. 12A;

FIG. 12C is a cross-sectional view of the movable section shown in FIG. 12A along chain line XIIC—XIIC in FIG. 12A;

FIG. 12D is a side view of the movable section shown in FIG. 12A as seen in the direction of arrow XIID in FIG. 12A;

FIG. 13 is a plan view of the movable section shown in FIG. 12A illustrating paths of heat;

FIG. 14A is a plan view of a movable section of an optical pickup in a fourth example according to the present invention;

FIG. 14B is a side view of the movable section shown in FIG. 14A as seen in the direction of arrow XIVB in FIG. 14A;

FIG. 14C is a cross-sectional view of the movable section shown in FIG. 14A along chain line XIVC—XIVC in FIG. 14A;

FIG. 14D is a side view of the movable section shown in FIG. 14A as seen in the direction of arrow XIVD in FIG. 14A;

FIG. 15 is a cross-sectional view of the movable section shown in FIG. 14A illustrating paths of heat;

FIG. 16A is a plan view of a movable section of an optical pickup in a fifth example according to the present invention;

FIG. 16B is a side view of the movable section shown in FIG. 16A as seen in the direction of arrow XVIB in FIG. 16A;

FIG. 16C is a cross-sectional view of the movable section shown in FIG. 16A along chain line XVIC—XVIC in FIG. 16A;

FIG. 16D is a side view of the movable section shown in FIG. 16A as seen in the direction of arrow XVID in FIG. 16A;

FIG. 16E is a cross-sectional view of the movable section shown in FIG. 16D along chain line XVIE—XVIE in FIG. 16D;

FIG. 18A is a plan view of a movable section of an optical pickup in a sixth example according to the present invention;

FIG. 18B is a side view of the movable section shown in FIG. 18A as seen in the direction of arrow XVIIIB in FIG. 18A;

FIG. 18C is a cross-sectional view of the movable section shown in. FIG. 18A along chain line XVIIIC—XVIIIC in FIG. 18A;

FIG. 18D is a side view of the movable section shown in FIG. 18A as seen in the direction of arrow XVIIID in FIG. 18A;

FIG. 19A is a plan view of a movable section of an optical pickup in a seventh example according to the present invention;

FIG. 19B is a side view of the movable section shown in FIG. 19A as seen in the direction of arrow XIXB in FIG. 19A;

FIG. 19C is a cross-sectional view of the movable section shown in FIG. 19A along chain line XIXC—XIXC in FIG. 19A;

FIG. 19D is a side view of the movable section shown in FIG. 19A as seen in the direction of arrow XIXD in FIG. 19A;

FIG. 21A is a plan view of a movable section of an optical pickup in an eighth example according to the present invention;

FIG. 21B is a side view of the movable section shown in FIG. 21A as seen in the direction of arrow XXIB in FIG. 21A;

FIG. 21C is a cross-sectional view of the movable section shown in FIG. 21A along chain line XXIC—XXIC in FIG. 21A; and FIG. 21D is a side view of the movable section shown in FIG. 21A as seen in the direction of arrow XXID in FIG. 21A.

DESCRIPTION OF THE PREFERRED EMBODIMENTS

In order to record information to and reproduce information from a disk-shaped recording medium, for example, a CD-ROM at a speed six times the standard speed, a movable section of an optical pickup should be driven at the same high speed. This is realized by increasing the amount of current flowing through a driving coil of the movable section or by reducing the weight of the movable section.

For reducing the weight of the movable section, an object lens is preferably formed of a resin instead of glass. However, an object lens formed of a resin has a resistance against heat lower than that of a glass lens. The resin lens may be deformed or melted when used at a temperature of about 100° C. or more.

When the amount of current flowing through the driving coil of the movable section is increased for the purpose of driving the movable section at a higher speed for a longer period of time, the driving coil generates heat by the resistance thereof as can be appreciated from expression (2) which will be explained below. The heat generated in the driving coil flows to the object lens through the lens holder, thereby deforming or melting the object lens.

Figure 1:
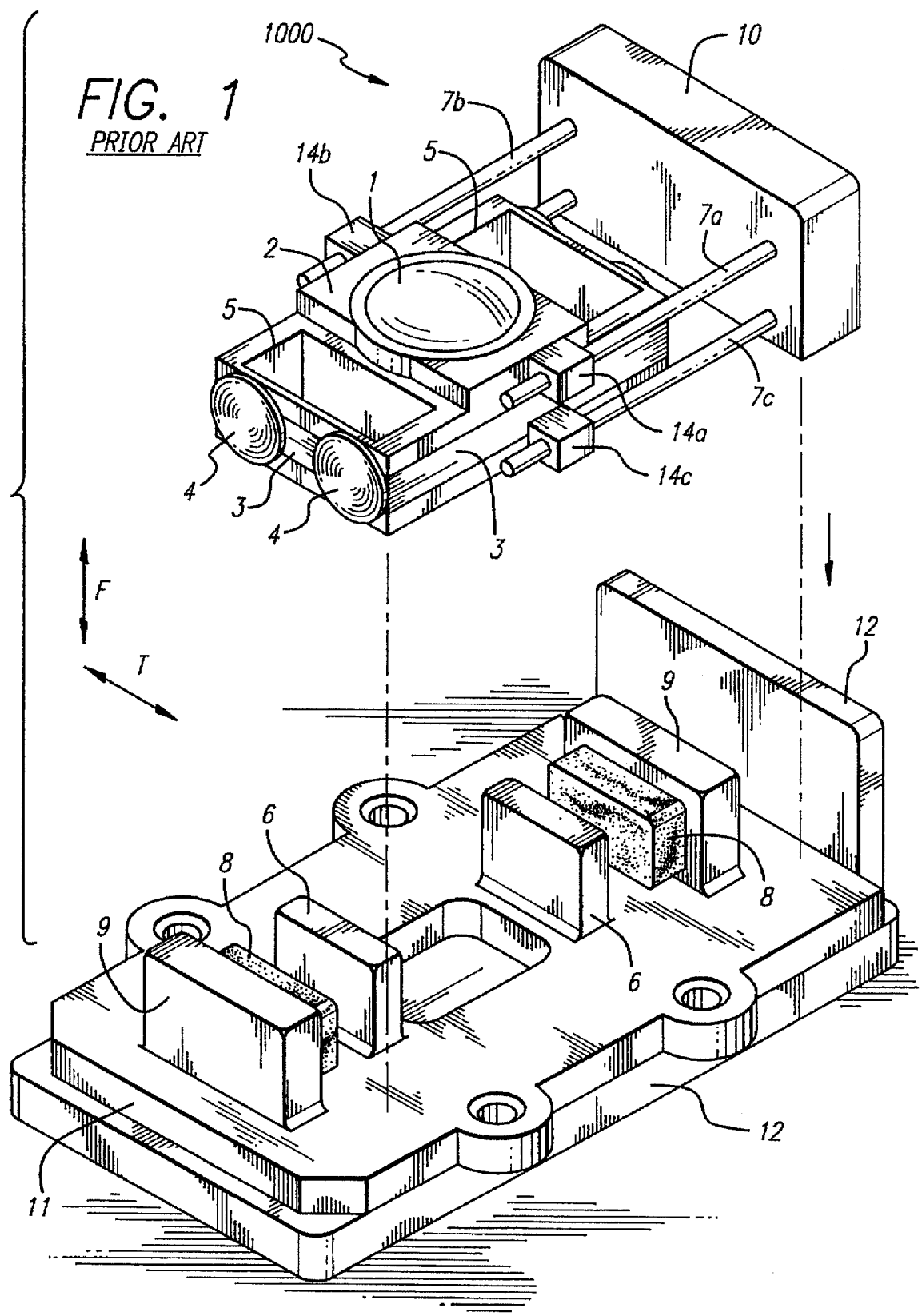
FIG. 1 is a partially exploded isometric view of a conventional optical pickup.
Figure 2:
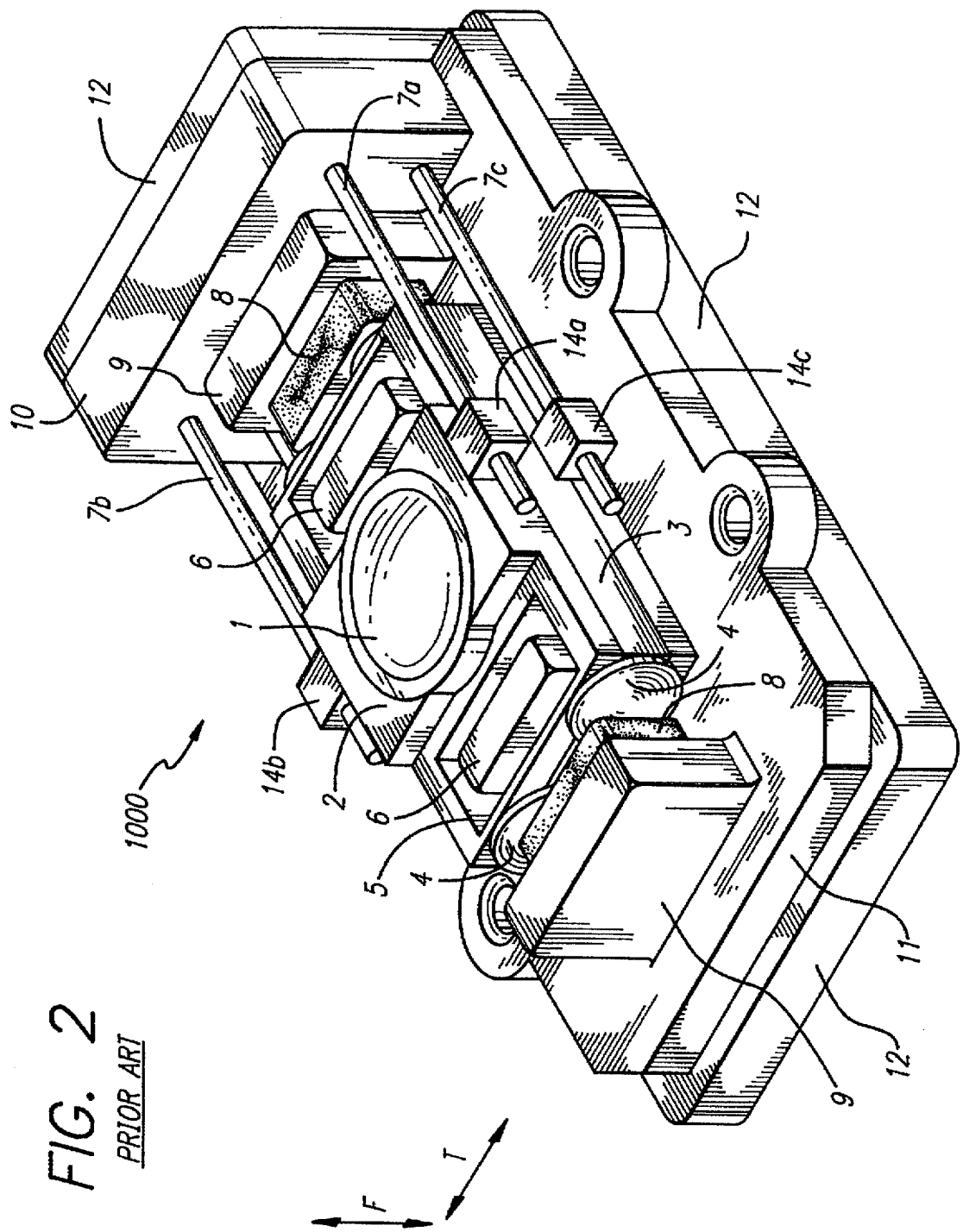
FIG. 2 is an isometric view of the optical pickup shown in FIG. 1.
Figure 3:
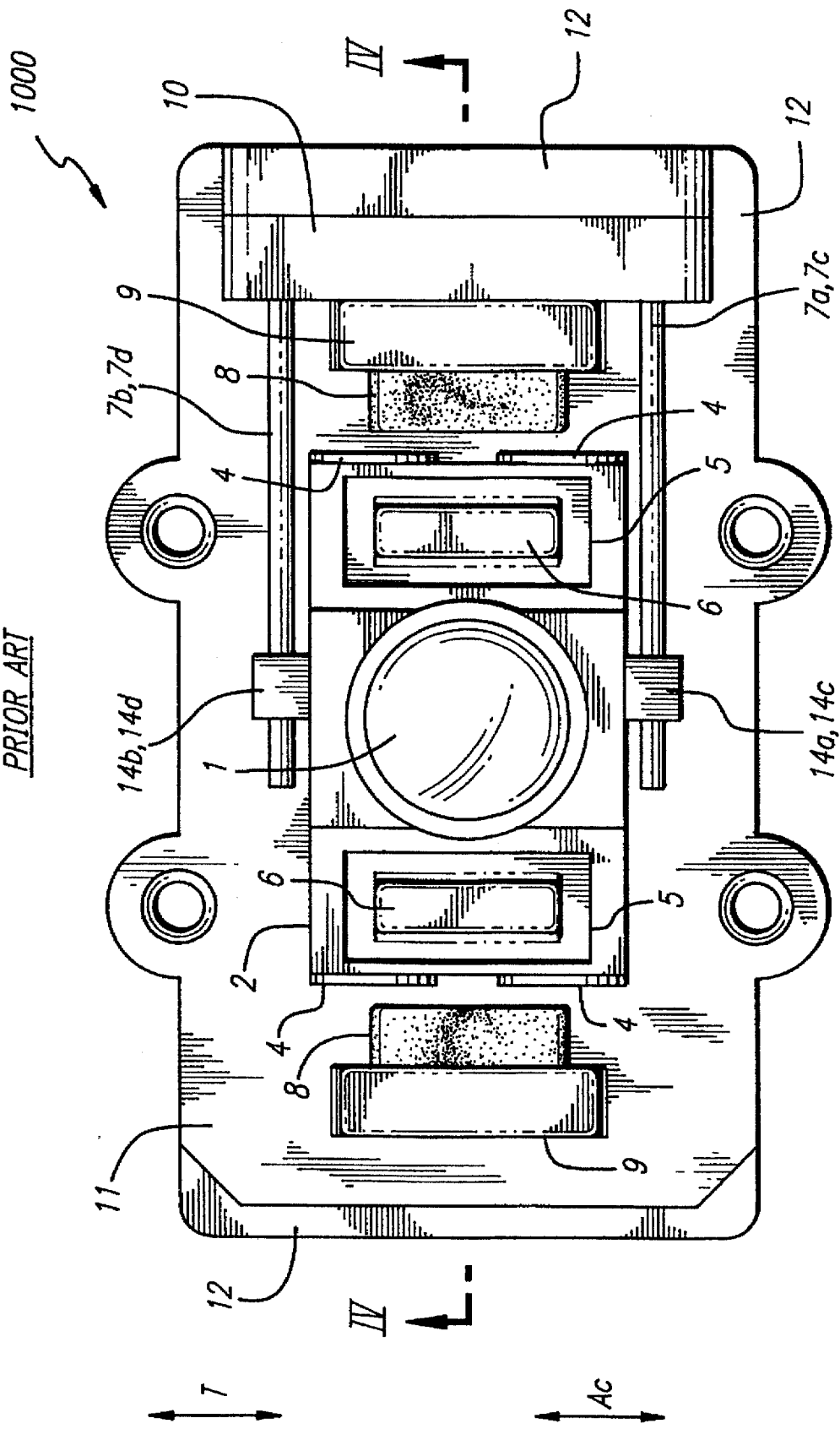
FIG. 3 is a plan view of the optical pickup shown in FIG. 2.
Figure 4:
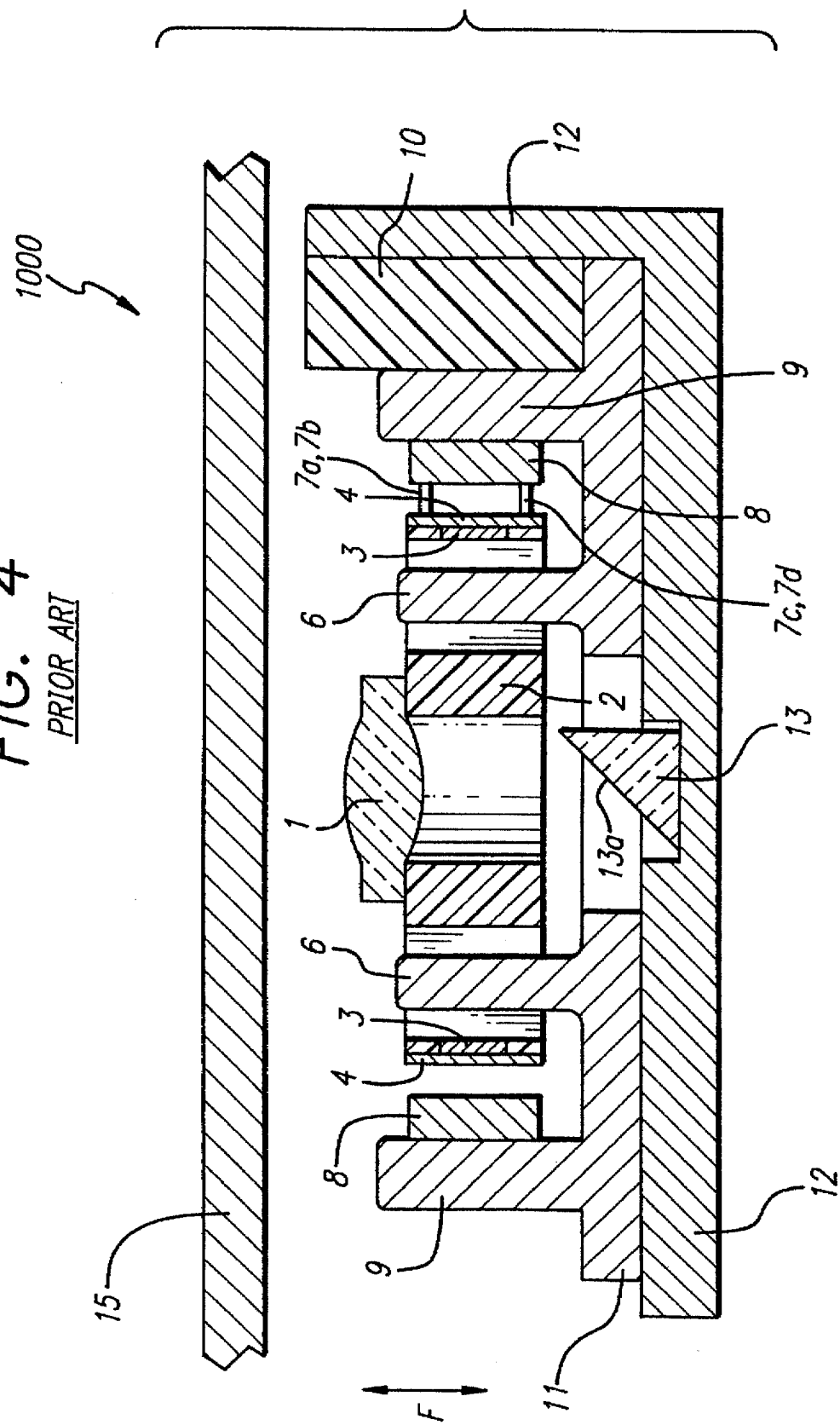
FIG. 4 is a cross-sectional view of the optical pickup shown in FIG. 3 along chain line IV—IV.
Figure 5:
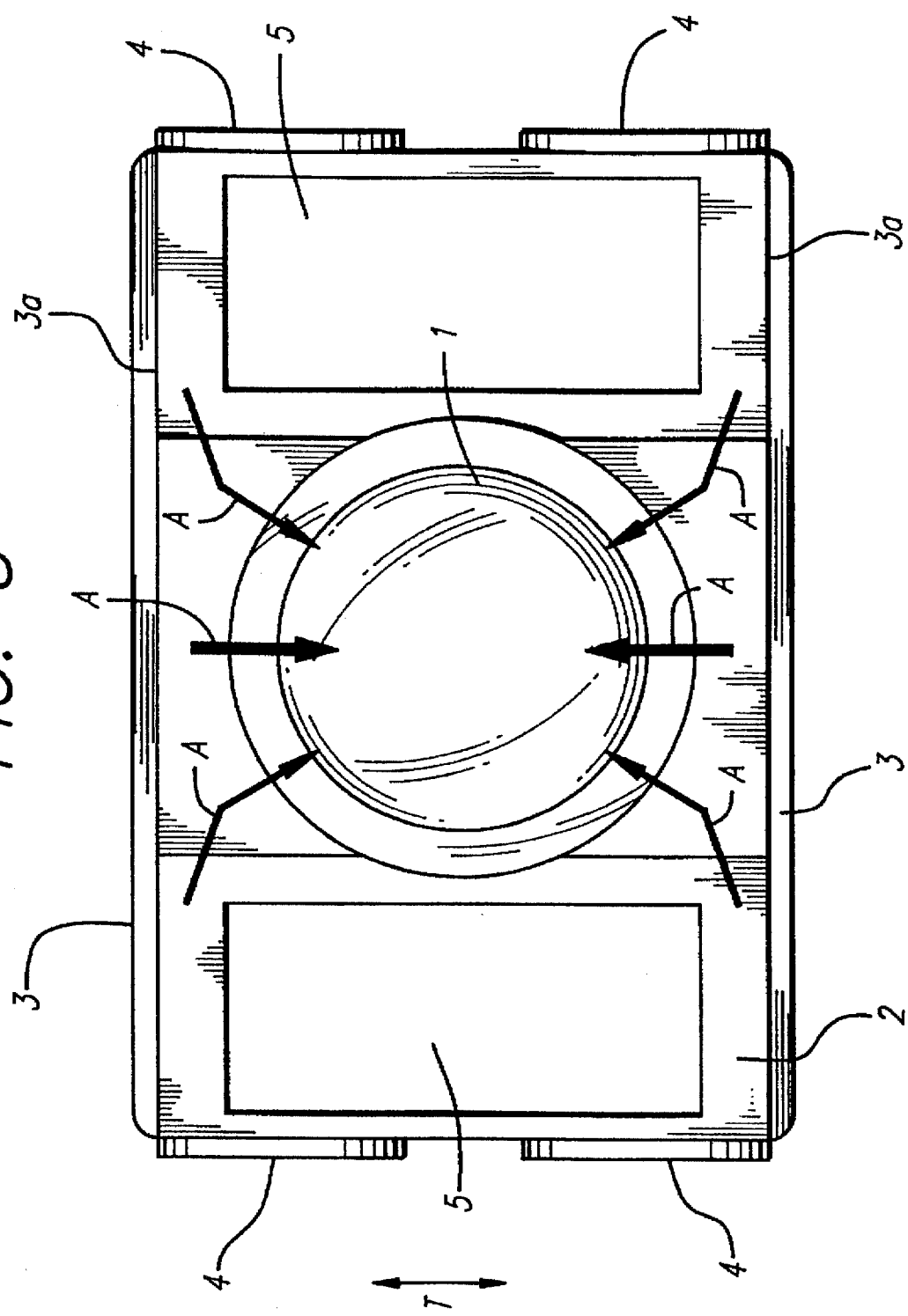
FIG. 5 is a plan view of a movable section of an optical pickup as a comparative example illustrating the results of analysis performed by the present inventors of paths of heat.

FIG. 5 is a plan view of a movable section of an optical pickup provided here as a comparative example. Arrows A represent paths of the heat from a driving coil (focusing coil 3 and tracking coils 4) to an object lens 1, which have been found by the inventors of the present invention. Different thicknesses of the arrows show different quantities of the heat. As shown here, more heat is propagated from side surfaces 3a of the lens holder 2 on which only the focusing coil 3 is provided than from the other two side surfaces on which tracking coils 4 are also provided. According to the present invention, a heat-insulating area is provided between the object lens 1 and the focusing coil 3 in order to reduce the quantity of heat flowing from the focusing coil 3 to the object lens 1.

Hereinafter, the present invention will be described by way of illustrative examples with reference to the accompanying drawings.

EXAMPLE 1

An optical pickup in a first example according to the present invention will be described with reference to FIGS. 6A through 6E, 7 and 8.

FIG. 6A is a plan view of a movable section 100 of an optical pickup in the first example used in an optical recording and reproduction apparatus. FIG. 6B is a side view of the movable section 100 as seen in the direction of arrow VIB in FIG. 6A. FIG. 6C is a cross-sectional view of the movable section 100 along chain line VIC—VIC in FIG. 6A. FIG. 6D is a side view of the movable section 100 as seen in the direction of arrow VID in FIG. 6A. FIG. 6E is a cross-sectional view of the movable section 100 along chain line VIE—VIE in FIG. 6D. Identical elements previously discussed with respect to FIGS. 1 through 4 will bear identical reference numerals therewith and the descriptions thereof will be omitted. In FIG. 6D, a surface of the lens holder 2 on which the object lens 1 is mounted is a top surface of the lens holder 2, and the opposite surface is a bottom surface of the lens holder 2.

As shown in FIGS. 6A through 6E, the movable section 100 includes an object lens 1, a lens holder 2, a focusing coil 3, tracking coils 4, and through-holes 5 as in the conventional optical pickup 1000. The lens holder 2 has at least four side surfaces. Among four side surfaces of the lens holder 2, the two side surfaces on which only the focusing coil 3 is provided are closer to an outer peripheral surface of the object lens 1 than the other two side surfaces on which the tracking coils 4 are also provided. The object lens 1 can be formed of a resin, and the lens holder 2 can be formed of a resin or a liquid crystal polymer.

As shown in FIGS. 6A, 6C and 6E, the lens holder 2 has heat-releasing through-holes 101 between the object lens 1 and the focusing coil 3. Air 105 in the through-holes 101 acts as a heat-insulating material to form a heat-insulating area between the object lens 1 and the focusing coil 3.

Figure 7:
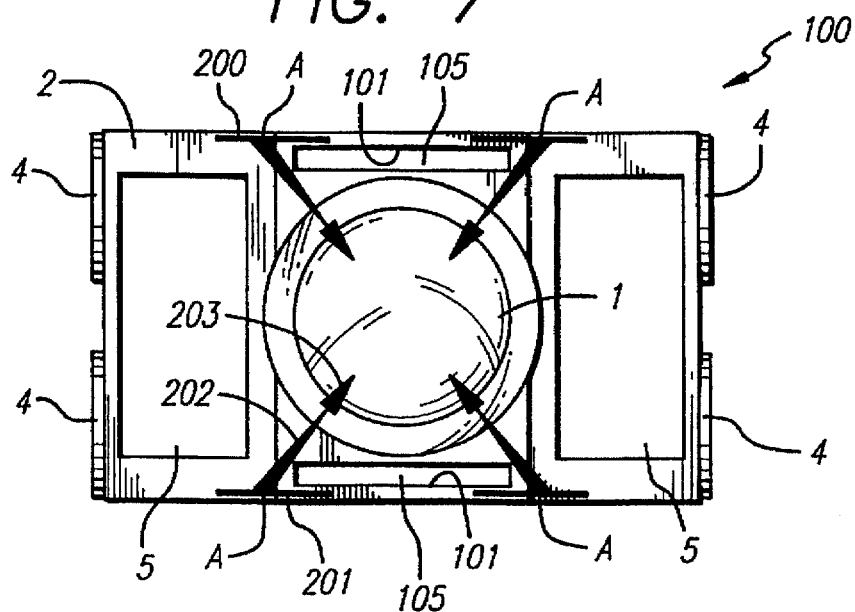
FIG. 7 is a plan view of the movable section shown in FIG. 6A illustrating paths of heat.

With reference to FIG. 7, an effect of the movable section 100 of an optical pickup in the first example will be described.

FIG. 7 is a plan view of the movable section 100 illustrating heat propagation. Arrows A represent paths of the heat from the focusing coil 3 (FIG. 6E) to the object lens 1.

The thermal conductivity of air (about 0.03 W/mK) is significantly lower than the thermal conductivity of the lens holder 2 (about 0.1 to 1.0 W/mK). Accordingly, the air 105 in the heat-releasing through-holes 101 insulates the object lens 1 from heat in a satisfactory manner.

For example, heat at a point 201 is not directly propagated to the object lens 1, but is first propagated to a point 202 and then propagated to a point 203 in the object lens 1. As a result of the insulating properties of the air 105 in the heat-releasing through-holes 101, the flow of heat to the object lens 1 is effectively prevented, thereby restricting the temperature rise in the object lens 1.

Figure 8:
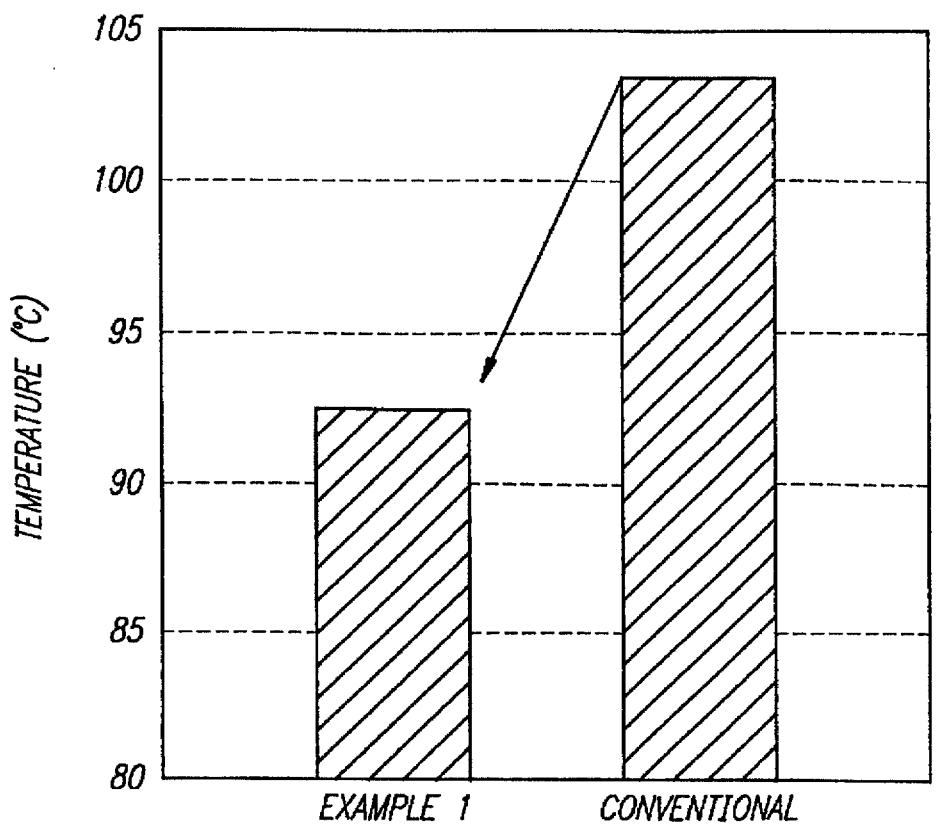
FIG. 8 is a graph illustrating the temperature of an object lens in the optical pickup shown in FIG. 6A and in the conventional optical pickup.

FIG. 8 is a graph illustrating the temperature at the center of the object lenses 1 of the movable section 100 of the optical pickup in the first example and the movable section of the conventional optical pickup 1000 which are driven in an oven having a temperature of 80° C. The temperature is obtained with respect to the same quantity of heat generated in the focusing coils 3. As shown in FIG. 8, the temperature of the object lens 1 can be lower in the movable section 100 of the optical pickup in the first example than in the conventional optical pickup 1000.

In lieu of using the air 105 in the heat-releasing through-holes 101 for insulating the object lens 1 from heat, a different material having a thermal conductivity lower than that of the lens holder 2 may be inserted into the heat-releasing through-holes 101. The material can be gaseous, solid or liquid as long as the thermal conductivity thereof is lower than that of the lens holder 2. A liquid material may be accommodated in a sealed case.

Each of the heat-releasing holes 101 is one lengthy rectangular hole in FIGS. 6A and 6E, but may include a plurality of smaller through-holes and may have any shape which forms heat-insulating areas between the object lens 1 and the focusing coil 3.

EXAMPLE 2

An optical pickup in a second example according to the present invention will be described with reference to FIGS. 9A through 9F, 10 and 11.

FIG. 9A is a plan view of a movable section 200 of an optical pickup in the second example used in an optical recording and reproduction apparatus. FIG. 9B is a side view of the movable section 200 as seen in the direction of arrow IXB in FIG. 9A. FIG. 9C is a cross-sectional view of the movable section 200 along chain line IXC—IXC in FIG. 9A. FIG. 9D is a side view of the movable section 200 as seen in the direction of arrow IXD in FIG. 9A. FIG. 9E is a cross-sectional view of the movable section 200 along chain line IXE—IXE in FIG. 9D. FIG. 9F is a cross-sectional view of the movable section 200 along chain line IXF—IXF in FIG. 9A. Identical elements previously discussed with respect to FIGS. 6A through 6E will bear identical reference numerals therewith and the descriptions thereof will be omitted.

The movable section 200 in the second example is different from the movable section 100 in the first example in the following point.

As shown in FIGS. 9A, 9C and 9E, the object lens 1 is partially out of contact with the lens holder 2. In detail, as shown in FIGS. 9C, 9E and 9F, the lens holder 2 has heat-releasing through-holes 102 extending to below the object lens 1, and thus an outer peripheral area of the object lens 1 is only partially in contact with the lens holder 2 to be held thereon.

Figure 10:
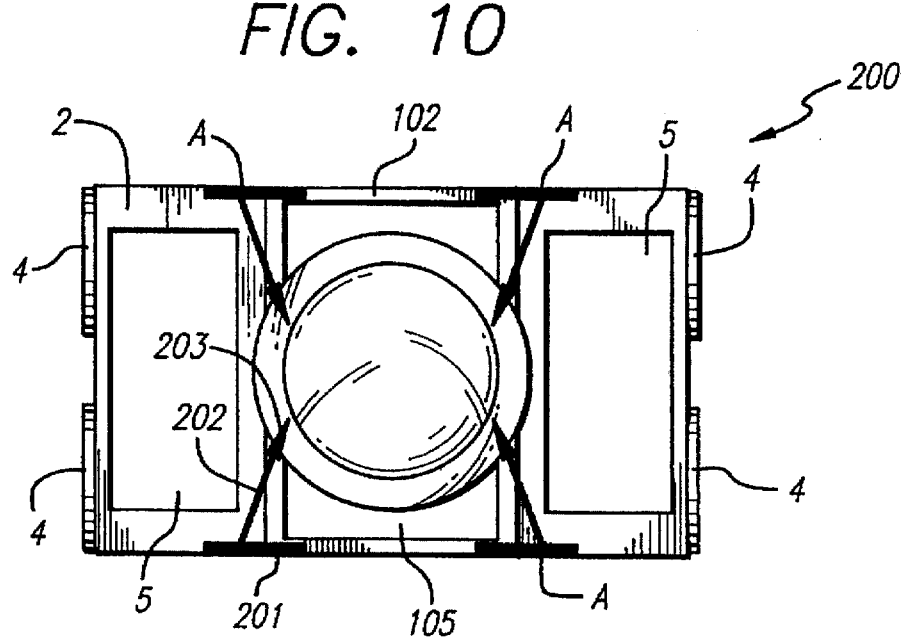
FIG. 10 is a plan view of the movable section shown in FIG. 9A illustrating paths of heat.

With reference to FIG. 10, an effect of the movable section 200 of an optical pickup in the second example will be described.

FIG. 10 is a plan view of the movable section 200 illustrating heat propagation. Arrows A represent paths of the heat from the focusing coil 3 (FIG. 9E) to the object lens 1. Different thicknesses of the arrows show different quantities of the heat. As in the first example, the air 105 in the heat-releasing through-holes 102 acts as a heat-insulating material.

Accordingly, heat at a point 201 is not directly propagated to the object lens 1, but is first propagated to a point 202 and then propagated to a point 203 in the object lens 1. The heat flows to the object lens 1 only through the areas where the object lens 1 is in contact with the lens holder 2. Since the object lens 1 is in contact with the lens holder 2 through a part of the peripheral area thereof, the contact area of the object lens 1 and the lens holder 2 is still smaller than that of the movable section 100 in the first example. Since the object lens 1 is insulated from heat by the air 105 in the heat-releasing through-holes 102, the flow of the heat to the object lens 1 is prevented more than in the first example, thereby further restricting the temperature rise in the object lens 1.

Moreover, the paths of the heat propagation (for example, from the point 201 to the point 203 via the point 202) in the movable section 200 are longer than those in the first example. Therefore, the heat is mostly dissipated outside before reaching the point 203. As a result, the flow of the heat to the object lens 1 is further restricted, and thus the temperature of the object lens 1 is significantly lower than that of the focusing coil 3.

Figure 11:
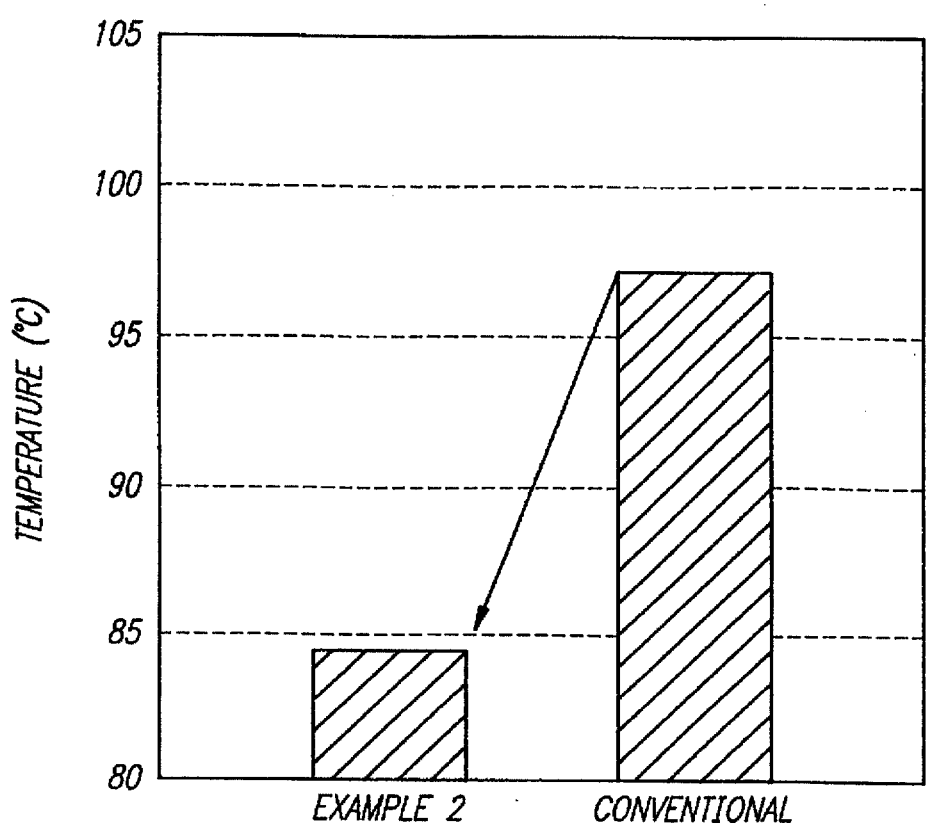
FIG. 11 is a graph illustrating the temperature of an object lens in the optical pickup shown in FIG. 9A and in the conventional optical pickup.

FIG. 11 is a graph illustrating the temperature at the center of the object lenses 1 of the movable section 200 of the optical pickup in the second example and the movable section of the conventional optical pickup 1000 which are driven in an oven having a temperature of 80° C. The temperature is obtained with respect to the same quantity of heat generated in the focusing coils 3. As shown in FIG. 11, the temperature of the object lens 1 can be lower in the movable section 200 of the optical pickup in the second example than in the conventional optical pickup 1000.

In the second example, the weight of the movable section 200 can be significantly reduced compared to that of the conventional optical pickup 1000 due to the heat-releasing through-holes 102. As represented by expression (1), the acceleration ($\alpha$) of a movable section of an optical pickup is in inverse proportion to the weight (m) thereof, and therefore the movable section 200 can move faster than the movable section of the conventional optical pickup 1000 with respect to an equal amount of current flowing through the coil. In expression (1), letter B represents the magnetic flux density, letter I represents the amount of current flowing through the coil, and letter L represents the effective length of the magnetic field of the coil.

$$\alpha = BIL/m \qquad (1)$$

From a different point of view, less current is required for driving the movable section 200 at an equal or desired acceleration. As represented by expression (2), the quantity of heat (Q) generated in a focusing coil per a unit length is in proportion to the square of the amount of current (I). Therefore, the quantity of heat generated in the focusing coil 3 of the movable section 200 can be reduced, and thus the temperature of the object lens 1 can be reduced. In expression (2), letter R represents the resistance of the coil.

$$Q = I^2 R \qquad (2)$$

Furthermore in the movable section 200 in the second example, the object lens 1 is in contact with the lens holder 2 through a smaller area and thus is more exposed to the air. Accordingly, the heat propagated to the object lens 1 is dissipated to the air from the surface of the object lens 1. This also contributes to the lower temperature of the object lens 1.

In lieu of using the air 105 in the heat-releasing through-holes 102 for insulating the object 1 from heat, a different material having a thermal conductivity lower than that of the lens holder 2 may be inserted into the heat-releasing through-holes 102. The material can be gaseous, solid or liquid as long as the thermal conductivity thereof is lower than that of the lens holder 2. A liquid material may be accommodated in a sealed case.

EXAMPLE 3

An optical pickup in a third example according to the present invention will be described with reference to FIGS. 12A through 12D and 13.

FIG. 12A is a plan view of a movable section 300 of an optical pickup in the third example used in an optical recording and reproduction apparatus. FIG. 12B is a side view of the movable section 300 as seen in the direction of arrow XIIB in FIG. 12A. FIG. 12C is a cross-sectional view of the movable section 300 along chain line XIIC—XIIC in FIG. 12A. FIG. 12D is a side view of the movable section 300 as seen in the direction of arrow XIID in FIG. 12A. Identical elements previously discussed with respect to FIGS. 6A through 6E will bear identical reference numerals therewith and the descriptions thereof will be omitted.

The movable section 300 in the third example is different from the movable section 100 in the first example in the following point.

As shown in FIGS. 12A and 12C, heat-insulating elements 103 are provided between an outer circumferential surface of the object lens 1 and the lens holder 2, in lieu of the heat-releasing through-holes 101. The heat-insulating elements 103 have a thermal conductivity lower than that of the lens holder 2. The heat-insulating elements 103 can be formed of, for example, rubber, silica aerogel, silica gel grease, fiber, foam glass, or a viscous fluid.

With reference to FIG. 13, an effect of the movable section 300 of an optical pickup in the third example will be described.

FIG. 13 is a plan view of the movable section 300 illustrating heat propagation. Arrows A represent paths of the heat from the focusing coil 3 (FIG. 12C) to the object lens 1. Different thicknesses of the arrows show different quantities of the heat.

The heat generated by the focusing coil 3 is mostly directed to the object lens 1 through the lens holder 2 but the object lens 1 is insulated from the heat by the heat-insulating elements 103. Thus, the flow of the heat to the object lens 1 is effectively prevented, thereby restricting the temperature rise in the object lens 1 even though the temperature of the lens holder 2 is raised.

In the third example, the shape of the lens holder 2 need not be changed in order to restrict the temperature rise in the object lens 1. Accordingly, the production cost can also be restricted.

EXAMPLE 4

An optical pickup in a fourth example according to the present invention will be described with reference to FIGS. 14A through 14D and 15.

FIG. 14A is a plan view of a movable section 400 of an optical pickup in the fourth example used in an optical recording and reproduction apparatus. FIG. 14B is a side view of the movable section 400 as seen in the direction of arrow XIVB in FIG. 14A. FIG. 14C is a cross-sectional view of the movable section 400 along chain line XIVC—XIVC in FIG. 14A. FIG. 14D is a side view of the movable section 400 as seen in the direction of arrow XIVD in FIG. 14A. Identical elements previously discussed with respect to FIGS. 6A through 6E will bear identical reference numerals therewith and the descriptions thereof will be omitted.

The movable section 400 in the fourth example is different from the movable section 100 in the first example in the following point.

As best shown in FIG. 14C, the lens holder 2 is formed of a porous material, for example, polycarbonate foam, polyethylene foam, or polypropylene foam, in lieu of having the heat-releasing through-holes 101. The lens holder 2 contains air 105 in pores 104 therein (FIG. 14C).

With reference to FIG. 15, an effect of the movable section 400 of an optical pickup in the fourth example will be described.

FIG. 15 is a cross-sectional view of the movable section 400 along lines XIVC—XIVC in FIG. 14A illustrating heat propagation. Arrows A represents paths of the heat from the focusing coil 3 (FIG. 14C) to the object lens 1. Different thicknesses of the arrows show different quantities of the heat.

The heat generated by the focusing coil 3 is mostly directed to the object lens 1 through the lens holder 2 but the object lens 1 is insulated from the heat by the air 105 contained in the lens holder 2. Thus, the flow of the heat to the object lens 1 is effectively prevented, thereby restricting the temperature rise in the object lens 1.

In the fourth example, the shape of the lens holder 2 need not be changed in order to restrict the temperature rise in the object lens 1. Accordingly, the production cost can also be restricted.

In the fourth example, the weight of the movable section 400 can be significantly reduced compared to that of the conventional optical pickup 1000 because the lens holder 2 is formed of a porous material. As described in the second example with reference to expression (1), the acceleration of the movable section 400 is improved. Accordingly, the movable section 400 can move faster for an equal amount of current flowing in the coil. In order to move the movable section 400 at a prescribed speed, the amount of current required can be reduced. As described also in the second example with reference to expression (2), when the required amount of current is less, the quantity of heat generated in a focusing coil per a unit length is reduced. Thus, the temperature rise in the object lens 1 is restricted.

In lieu of using the air 105 in the pores 104 for insulating the object lens 1 from heat, the pores 104 may be filled with a different material having a thermal conductivity lower than that of the lens holder 2. The material can be gaseous, solid or liquid as long as the thermal conductivity thereof is lower than that of the lens holder 2.

EXAMPLE 5

An optical pickup in a fifth example according to the present invention will be described with reference to FIGS. 16A through 16E and 17.

FIG. 16A is a plan view of a movable section 500 of an optical pickup in the fifth example used in an optical recording and reproduction apparatus. FIG. 16B is a side view of the movable section 500 as seen in the direction of arrow XVIB in FIG. 16A. FIG. 16C is a cross-sectional view of the movable section 500 along chain line XVIC—XVIC in FIG. 16A. FIG. 16D is a side view of the movable section 500 as seen in the direction of arrow XVID in FIG. 16A. FIG. 16E is a plan view of the movable section 500 along chain line XVIE—XVIE in FIG. 16D. Identical elements previously discussed with respect to FIGS. 6A through 6E will bear identical reference numerals therewith and the descriptions thereof will be omitted.

The movable section 500 in the fifth example is different from the movable section 100 in the first example in the following point.

As best shown in FIG. 16C, the lens holder 2 has grooves 106 and 107 between the object lens 1 and the focusing coil 3 in lieu of the heat-releasing through-holes 101. The grooves 106 are extended downward in the focusing direction F (FIG. 16D) from a top surface of the lens holder 2, and the grooves 107 are extended upward in the focusing direction F from a bottom surface of the lens holder 2. In the focusing direction F, the grooves 106 and 107 partially overlap each other by length l. The air 105 in the grooves 106 and 107 acts as a heat-insulating material to form heat-insulating areas between the object lens 1 and the focusing coil 3. Length l is preferably ⅓ or more of height h of the lens holder 2.

Figure 17:
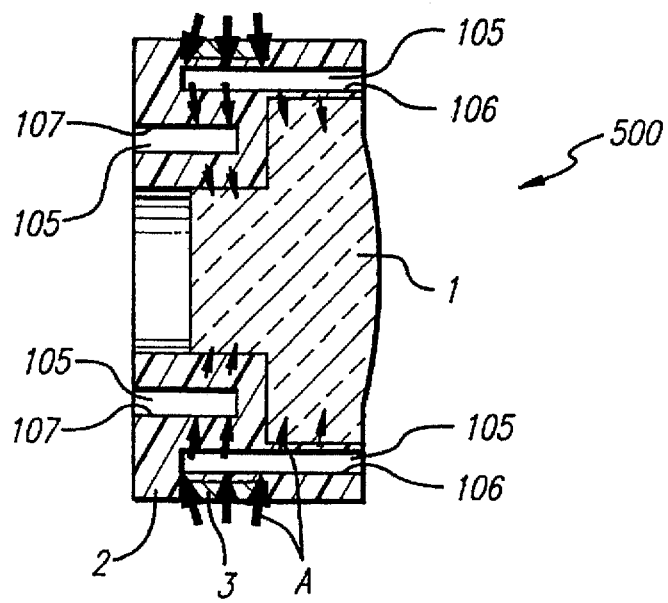
FIG. 17 is a cross-sectional view of the movable section shown in FIG. 16A illustrating paths of heat.

With reference to FIG. 17, an effect of the movable section 500 of an optical pickup in the fifth example will be described.

FIG. 17 is a cross-sectional view of the movable section 500 along lines XVIC—XVIC in FIG. 16A illustrating heat propagation. Arrows A represent paths of the heat from the focusing coil 3 (FIG. 16C) to the object lens 1. Different thicknesses of the arrows show different quantities of the heat.

The thermal conductivity of air (about 0.03 W/mK) is significantly lower than the thermal conductivity of the lens holder 2 (about 0.1 to 1.0 W/mK) formed of a resin or the like. Accordingly, the air 105 in the grooves 106 and 107 insulates the object lens 1 from heat in a satisfactory manner.

The heat generated by the focusing coil 3 is mostly directed to the object lens 1 through the lens holder 2 but the object lens 1 is insulated from the heat by the air 105 in the grooves 106 and 107 in the lens holder 2. Thus, the flow of the heat to the object lens 1 is effectively prevented, thereby restricting the temperature rise in the object lens 1.

In lieu of using the air 105 in the grooves 106 and 107, a different material having a thermal conductivity lower than that of the lens holder 2 may be inserted into the grooves 106 and 107. The material can be gaseous, solid or liquid as long as the thermal conductivity thereof is lower than that of the lens holder 2. A liquid material may be accommodated in a sealed case.

Each of the grooves 106 and 107 is one lengthy rectangular hole in FIGS. 16A and 16E, but may include a plurality of smaller grooves. The grooves 106 and 107 may have any shape which forms heat-insulating areas between the object lens 1 and the focusing coil 3.

EXAMPLE 6

An optical pickup in a sixth example according to the present invention will be described with reference to FIGS. 18A through 18D.

FIG. 18A is a plan view of a movable section 600 of an optical pickup in the sixth example used in an optical recording and reproduction apparatus. FIG. 18B is a side view of the movable section 600 as seen in the direction of arrow XVIIIB in FIG. 18A. FIG. 18C is a cross-sectional view of the movable section 600 along chain line XVIIIC—XVIIIC in FIG. 18A. FIG. 18D is a side view of the movable section 600 as seen in the direction of arrow XVIIID in FIG. 18A. Identical elements previously discussed with respect to FIGS. 6A through 6E will bear identical reference numerals therewith and the descriptions thereof will be omitted.

The movable section 600 in the sixth example is different from the movable section 100 in the first example in the following point.

As shown in FIGS. 18A and 18C, a plurality of coil supporting elements 108 are provided on each of the side surfaces of the lens holder 2 perpendicular to the tracking direction T, in lieu of the heat-releasing through-holes 101. The coil supporting elements 108 extend substantially in the focusing direction F, namely, cross the focusing coil 3. By the coil supporting elements 108, spaces 109 containing the air 105 are formed between the object lens 1 and the focusing coil 3. The spaces 109 act as heat-insulating areas. The coil supporting elements 108 can be integrally formed with the lens holder 2 or connected to the lens holder 2 after the lens holder 2 is formed.

In the movable section 600 having such a structure, the heat is propagated in the following manner.

The heat generated by the focusing coil 3 is mostly dissipated in the spaces 109. Thus, the flow of the heat to the lens holder 2 is effectively prevented, thereby restricting the temperature rise in the object lens 1 and also in the lens holder 2.

In the sixth example, the shape of the lens holder 2 need not be changed in order to restrict the temperature rise in the object lens 1. Accordingly, the production cost can also be restricted.

In lieu of using the air 105 in the spaces 109, a different material having a thermal conductivity lower than that of the lens holder 2 may be inserted into the spaces 109. The material can be gaseous, solid or liquid as long as the thermal conductivity thereof is lower than that of the lens holder 2. A liquid material may be accommodated in a sealed case.

The shape of the coil supporting elements 108 is a rectangular parallelepiped in FIGS. 18A and 18C, but may be semi-cylindrical. The coil supporting elements 108 can be provided in the movable sections in the first through fifth examples at the same positions as in the sixth example.

EXAMPLE 7

An optical pickup in a seventh example according to the present invention will be described with reference to FIGS. 19A through 19D and 20.

FIG. 19A is a plan view of a movable section 700 of an optical pickup in the seventh example used in an optical recording and reproduction apparatus. FIG. 19B is a side view of the movable section 700 as seen in the direction of arrow XIXB in FIG. 19A. FIG. 19C is a cross-sectional view of the movable section 700 along chain line XIXC—XIXC in FIG. 19A. FIG. 19D is a side view of the movable section 700 as seen in the direction of arrow XIXD in FIG. 19A. Identical elements previously discussed with respect to FIGS. 6A through 6E will bear identical reference numerals therewith and the descriptions thereof will be omitted.

The movable section 700 in the seventh example is different from the movable section 100 in the first example in the following point.

As shown in FIGS. 19A and 19C, the lens holder 2 has grooves 110 in the side surfaces of the lens holder 2 perpendicular to the tracking direction T in lieu of the heat-releasing through-holes 101. The air 105 contained in the grooves 110 acts as a heat-insulating material, thus forming heat-insulating areas between the object lens 1 and the focusing coil 3.

In the movable section 700 having such a structure, the heat is propagated in the following manner.

The heat generated by the focusing coil 3 is directed to the lens holder 2 but is dissipated in the grooves 110. Thus, the flow of the heat to the lens holder 2 is effectively prevented, thereby restricting the temperature rise in the object lens 1 and also in the lens holder 2.

Figure 20:
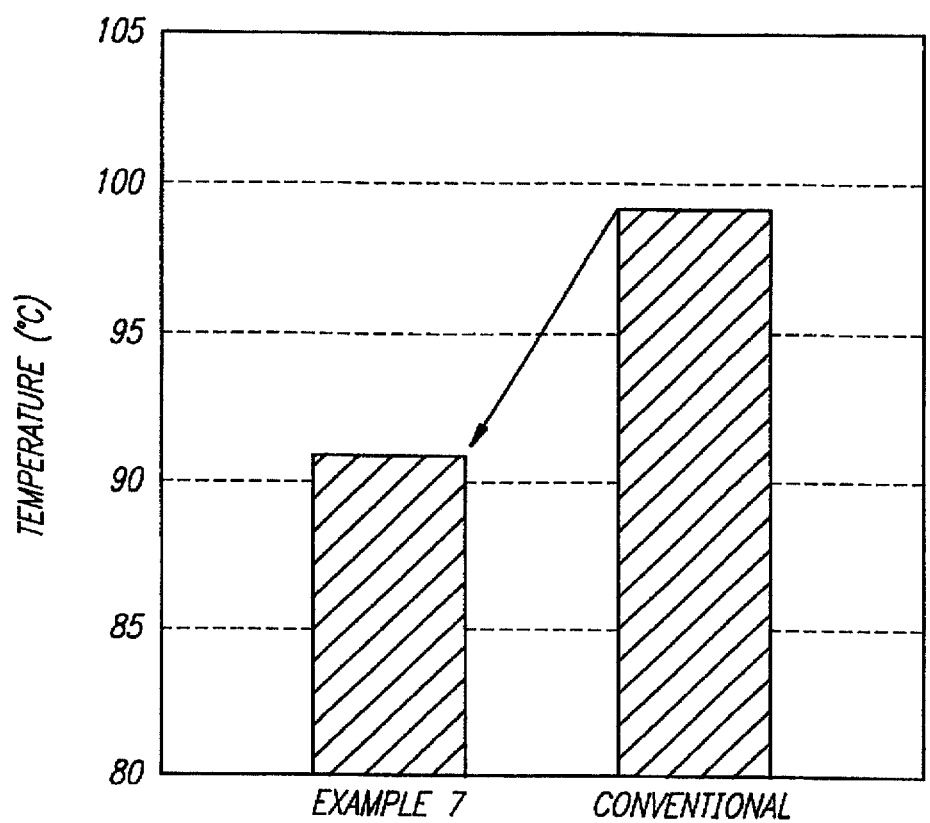
FIG. 20 is a graph illustrating the temperature of an object lens in the optical pickup shown in FIG. 19A and in the conventional optical pickup.

FIG. 20 is a graph illustrating the temperature at the center of the object lenses 1 of the movable section 700 of the optical pickup in the seventh example and the movable section of the conventional optical pickup 1000 which are driven in an oven having a temperature of 80° C. The temperature is obtained with respect to the same quantity of heat generated in the focusing coils 3. As shown in FIG. 20, the temperature of the object lens 1 can be lowered in the movable section 700 of the optical pickup in the seventh example than in the conventional optical pickup 1000.

The weight of the movable section 700 can be significantly reduced compared to that of the conventional optical pickup 1000 due to the grooves 110. As described in the second example with reference to expression (1), the acceleration of the movable section 700 is improved. Accordingly, the movable section 700 can move faster for an equal amount of current flowing in the coil. In order to move the movable section 700 at a prescribed speed, the amount of current required can be reduced. As described also in the second example with reference to expression (2), when the required amount of current is less, the quantity of heat generated in a focusing coil per a unit length is reduced. Thus, the temperature rise in the object lens 1 is restricted.

In lieu of using the air 105 in the grooves 110, a different material having a thermal conductivity lower than that of the lens holder 2 may be inserted into the grooves 110. The material can be gaseous, solid or liquid as long as the thermal conductivity thereof is lower than that of the lens holder 2. A liquid material may be accommodated in a sealed case.

Each of the grooves 110 is one lengthy rectangular hole extending in a direction perpendicular to the tracking direction T in FIGS. 19A and 19C, but may have any shape which forms heat-insulating areas between the object lens 1 and the focusing coil 3. The grooves 110 can be formed in the movable sections in the first through sixth examples at the same positions as in the seventh example.

EXAMPLE 8

An optical pickup in an eighth example according to the present invention will be described with reference to FIGS. 21A through 21D.

FIG. 21A is a plan view of a movable section 800 of an optical pickup in the eighth example used in an optical recording and reproduction apparatus. FIG. 21B is a side view of the movable section 800 as seen in the direction of arrow XXIIB in FIG. 21A. FIG. 21C is a cross-sectional view of the movable section 800 along chain line XXIIC—XXIC in FIG. 21A. FIG. 21D is a side view of the movable section 800 as seen in the direction of arrow XXIID in FIG. 21A. Identical elements previously discussed with respect to FIGS. 6A through 6E will bear identical reference numerals therewith and the descriptions thereof will be omitted.

The movable section 800 in the eighth example is different from the movable section 100 in the first example in the following point.

As shown in FIGS. 21A and 21C, the lens holder 2 has a plurality of heat-sink-shaped grooves 111 in each of the side surfaces of the lens holder 2 perpendicular to the tracking direction T in lieu of the heat-releasing through-holes 101. The air 105 contained in the grooves 111 acts as a heat-insulating material, thus forming heat-insulating areas between the object lens 1 and the focusing coil 3.

In the movable section 800 having such a structure, the heat is propagated in the following manner.

The heat generated by the focusing coil 3 is directed to the lens holder 2 but is dissipated in the grooves 111. Thus, the flow of the heat to the lens holder 2 is effectively prevented, thereby restricting the temperature rise in the object lens 1 and in the lens holder 2.

Furthermore, the plurality of grooves 111 formed in each of the side surfaces increases the surface area of the side surfaces, which promotes the heat dissipation from the lens holder 2 to the outside. This also contributes to the lower temperature in the lens holder 2 and the object lens 1.

The weight of the movable section 800 can be significantly reduced compared to that of the conventional optical pickup 1000 due to the grooves 111. As described in the second example with reference to expression (1), the acceleration of the movable section 800 is improved. Accordingly, the movable section 800 can move faster for an equal amount of current flowing in the coil. In order to move the movable section 800 at a prescribed speed, the amount of current required can be reduced. As described also in the second example with reference to expression (2), when the required amount of current is less, the quantity of heat generated in a focusing coil per a unit length is reduced. Thus, the temperature rise in the object lens 1 is restricted.

In lieu of using the air 105 in the grooves 111, a different material having a thermal conductivity lower than that of the lens holder 2 may be inserted into the grooves 111. The material can be gaseous, solid or liquid as long as the thermal conductivity thereof is lower than that of the lens holder 2. A liquid material may be accommodated in a sealed case.

The grooves 111 can be formed in the movable sections in the first through sixth examples at the same positions as in the eighth example.

According to the present invention, a heat-insulating area is formed between the object lens 1 and the focusing coil 3. Due to such a structure, even if the amount of current flowing through the driving coil is increased in order to drive the movable section at a higher speed for a longer period of time and thus an excessive amount of heat is generated in the focusing coil 3, the flow of the heat to the object lens 1 is effectively prevented. Thus, the temperature rise of the objective lens 1 is restricted. Table 1 shows the temperatures of the objective lens 1 in the comparative example shown in FIG. 5 and the movable section 100 in the first example according to the present invention, along with the highest possible temperature at which the object lens 1 can perform in a satisfactory manner (upper limit).

TABLE 1

|  | Standard speed Comparative | 6 times faster Comparative | Present invention | Upper limit |
| --- | --- | --- | --- | --- |
| Lens | 100.8° C. | 112.1° C. | 97.7° C. | 100° C. |
| Coil | 107.3° C. | 122.2° C. | 104.0° C. | 120° C. |

(ambient temperature: 80° C.)

As can be appreciated from Table 1, the temperature of the object lens 1 according to the present invention is lower than that of the comparative example, and also is lower than the upper limit. Accordingly, the object lens 1 can perform sufficiently well without being deformed or melted.

In the case where a heat-insulating material which has a specific gravity lower than that of the lens material, for example, air is used, the weight of the movable section can be reduced compared to the conventional movable section. Accordingly, the driving speed is increased for an equal amount of driving current, i.e., without increasing the amount of driving current and yet obtaining an increased driving speed.

Due to the above-described effects and advantages, an optical pickup according to the present invention can be adopted in a device which is used in a place having a high temperature, for example, an automobile navigation system.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical pickup, comprising:
an object lens;
a lens holder for holding the object lens;
a visco-elastic suspender for suspending the lens holder so as to be movable in a focusing direction and a tracking direction;
a driving section for driving the lens holder in the focusing direction and the tracking direction, the driving section including a magnet, a yoke and a driving coil provided on the lens holder, the magnet and the yoke forming a magnetic circuit;
wherein a heat-insulating area is located between the object lens and the driving coil, the heat-insulating area including a heat-insulating material which has a thermal conductivity lower than that of the lens holder.

2. An optical pickup according to claim 1,
wherein the object lens is located at a substantial center of a top surface of the lens holder,
the driving coil includes a focusing coil and a tracking coil, and
the focusing coil is located around at least four side surfaces of the lens holder, and the tracking coil is located on two of the at least four side surfaces of the lens holder which extend parallel to the tracking direction.

3. An optical pickup according to claim 1, wherein the heat-insulating area is included in the lens holder.

4. An optical pickup according to claim 1, wherein the heat-insulating area is located between an outer circumferential surface of the object lens and the lens holder.

5. An optical pickup according to claim 1, wherein the heat-insulating area is located between the driving coil and two of the at least four side surfaces of the lens holder.

6. An optical pickup according to claim 1, wherein the heat-insulating material is air.

7. An optical pickup according to claim 1, wherein the heat-insulating material is a solid having a thermal conductivity lower than that of the lens holder.

8. An optical pickup according to claim 1, wherein the heat-insulating material is a sealed liquid having a thermal conductivity lower than that of the lens holder.

9. An optical pickup according to claim 1, wherein the lens holder has at least one through-hole.

10. An optical pickup according to claim 9, wherein a solid having a thermal conductivity lower than that of the lens holder is inserted into the through-hole.

11. An optical pickup according to claim 9, wherein a sealed liquid having a thermal conductivity lower than that of the lens holder is inserted into the through-hole.

12. An optical pickup according to claim 1, wherein the lens holder includes pores dispersed therein, the pores each including a heat-insulating material therein.

13. An optical pickup according to claim 1, wherein the lens holder is formed of a porous material including air therein.

14. An optical pickup according to claim 1, wherein the lens holder has a groove extending from a top surface of the lens holder and another groove extending from a bottom surface of the lens holder, and the heat-insulating material having a thermal conductivity lower than that of the lens holder is inserted into the grooves.

15. An optical pickup according to claim 14, wherein the heat-insulating material is air.

16. An optical pickup according to claim 1, wherein the lens holder is formed of a liquid crystal polymer.

17. An optical pickup according to claim 1, wherein the object lens is formed of a resin.

18. An optical pickup according to claim 1, further comprising a plurality of coil supporting elements between the driving coil and the lens holder.

19. An optical pickup according to claim 1,
wherein the lens holder has four side surfaces, two of the four side surfaces being closer to an outer peripheral surface of the object lens than the other two side surfaces,
the driving coil is provided around the four side surfaces, and
the two side surfaces which are closer to the outer peripheral surface of the object lens each have at least one groove.

* * * * *